(12) United States Patent
Kuwata

(10) Patent No.: US 7,032,068 B2
(45) Date of Patent: Apr. 18, 2006

(54) DISK CACHE MANAGEMENT METHOD OF DISK ARRAY DEVICE

(75) Inventor: Atsushi Kuwata, Tokyo (JP)

(73) Assignee: NEC Corporation, Tokyo (JP)

( * ) Notice: Subject to any disclaimer, the term of this patent is extended or adjusted under 35 U.S.C. 154(b) by 291 days.

(21) Appl. No.: 10/356,514

(22) Filed: Feb. 3, 2003

(65) Prior Publication Data

US 2003/0149839 A1    Aug. 7, 2003

(30) Foreign Application Priority Data

Feb. 4, 2002    (JP)    ............................. 2002-026380

(51) Int. Cl.
*G06F 12/00*    (2006.01)
(52) U.S. Cl. ...................... 711/113; 711/114
(58) Field of Classification Search ......... 711/113–114
See application file for complete search history.

(56) References Cited

U.S. PATENT DOCUMENTS 5,835,942 A * 11/1998 Putzolu ....................... 711/113
6,438,654 B1 * 8/2002 Elko et al. .................. 711/133

FOREIGN PATENT DOCUMENTS

| JP | 07-020994 | 1/1995 |
|----|-----------|--------|
| JP | 08-147218 | 6/1996 |
| JP | 08-314779 | 11/1996 |
| JP | 09-146842 | 6/1997 |
| JP | 2000-267815 | 9/2000 |
| JP | 2001-166993 | 6/2001 |

OTHER PUBLICATIONS

Japanese Office Action dated Aug. 30, 2005 with a partial English translation, MAT.018 2002-026380.

* cited by examiner

*Primary Examiner*—Matthew D. Anderson
(74) *Attorney, Agent, or Firm*—McGinn IP Law Group, PLLC

(57) ABSTRACT

A local memory mounted on a host director is provided with a local cache management region for managing a cache page at a steady open state in a cache management region on a shared memory, so that even after data transfer is completed after the use of a cache page on the shared memory subjected to opening processing is finished, the cache page in question is kept open at the steady open state without closing the cache page in question and when an access to the cache page in question is made from the same host director, processing of opening the cache page in question is omitted to improve response performance.

21 Claims, 10 Drawing Sheets

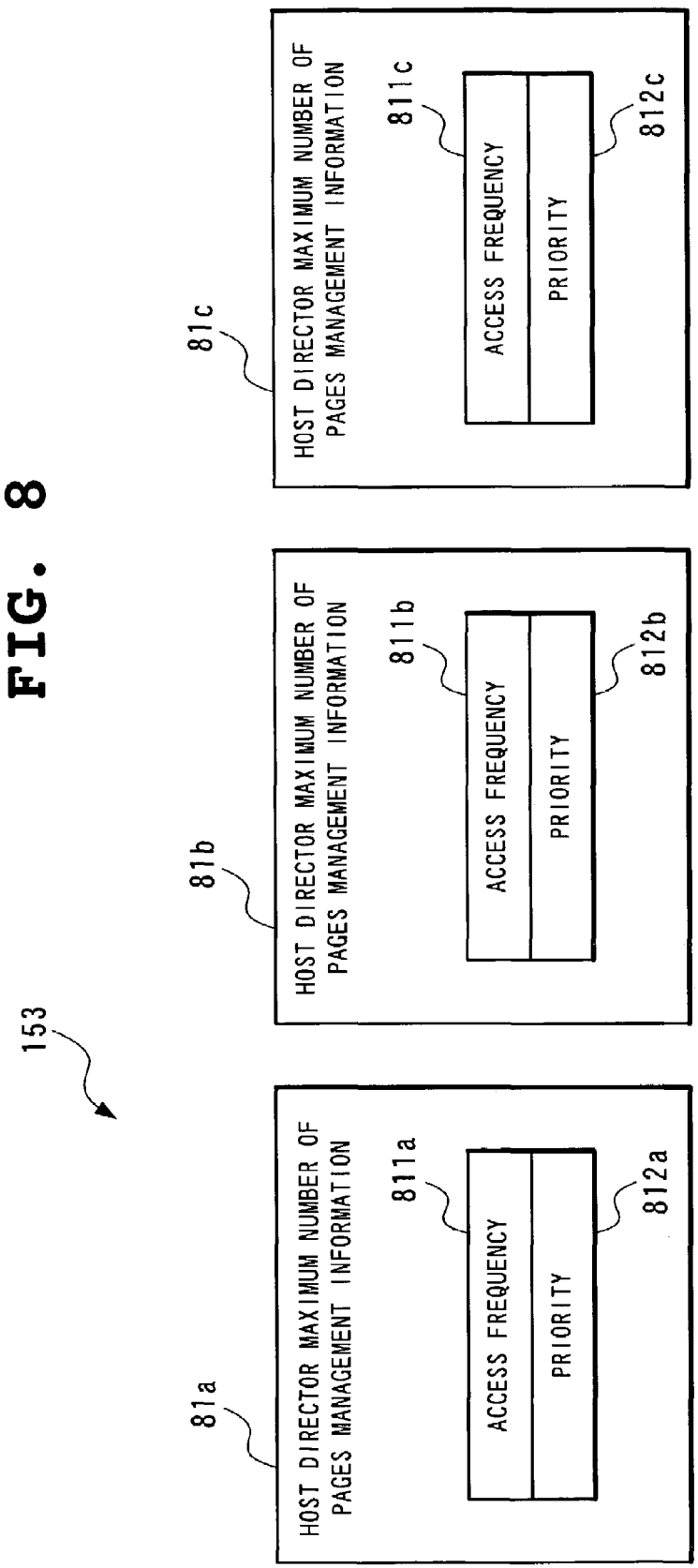

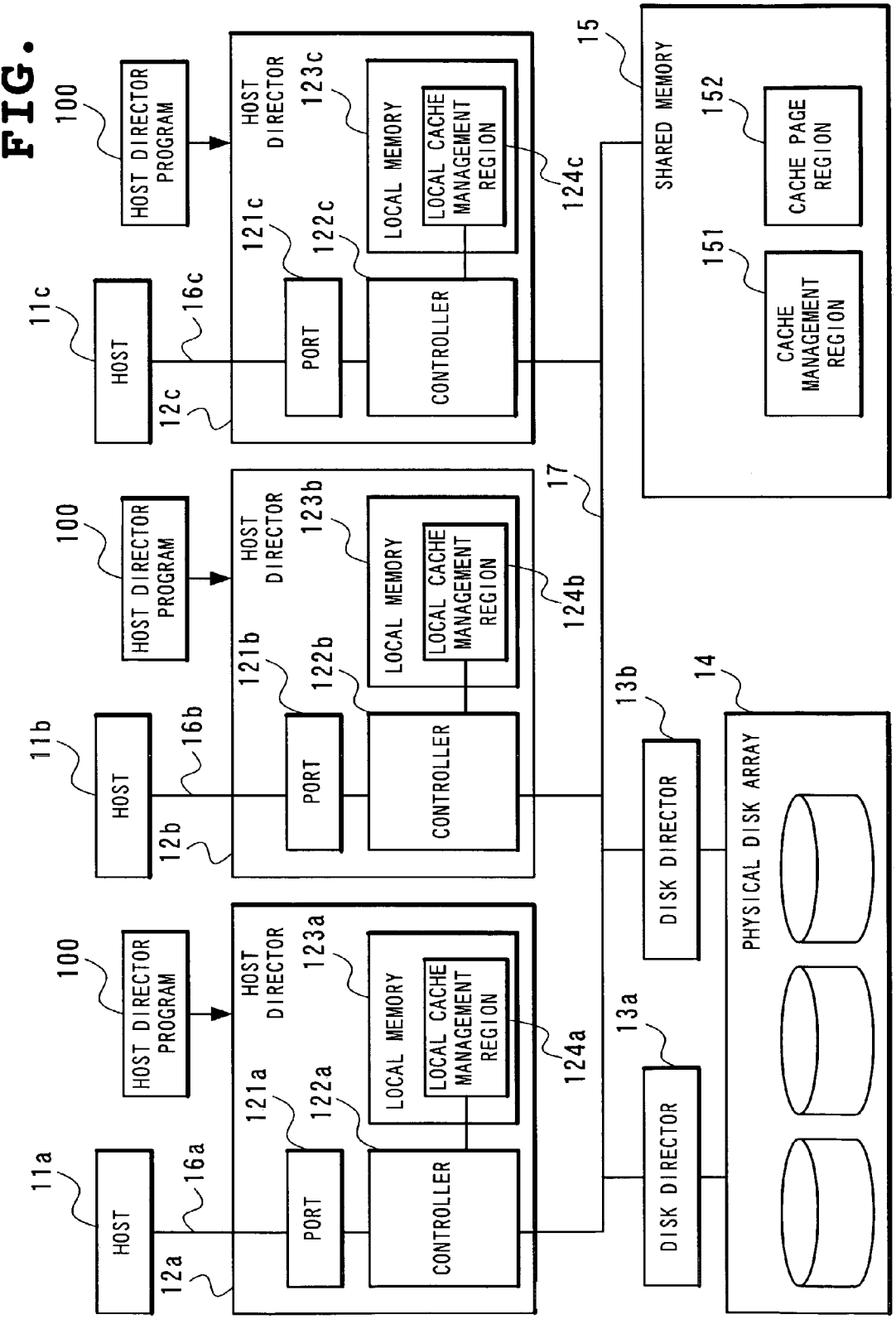

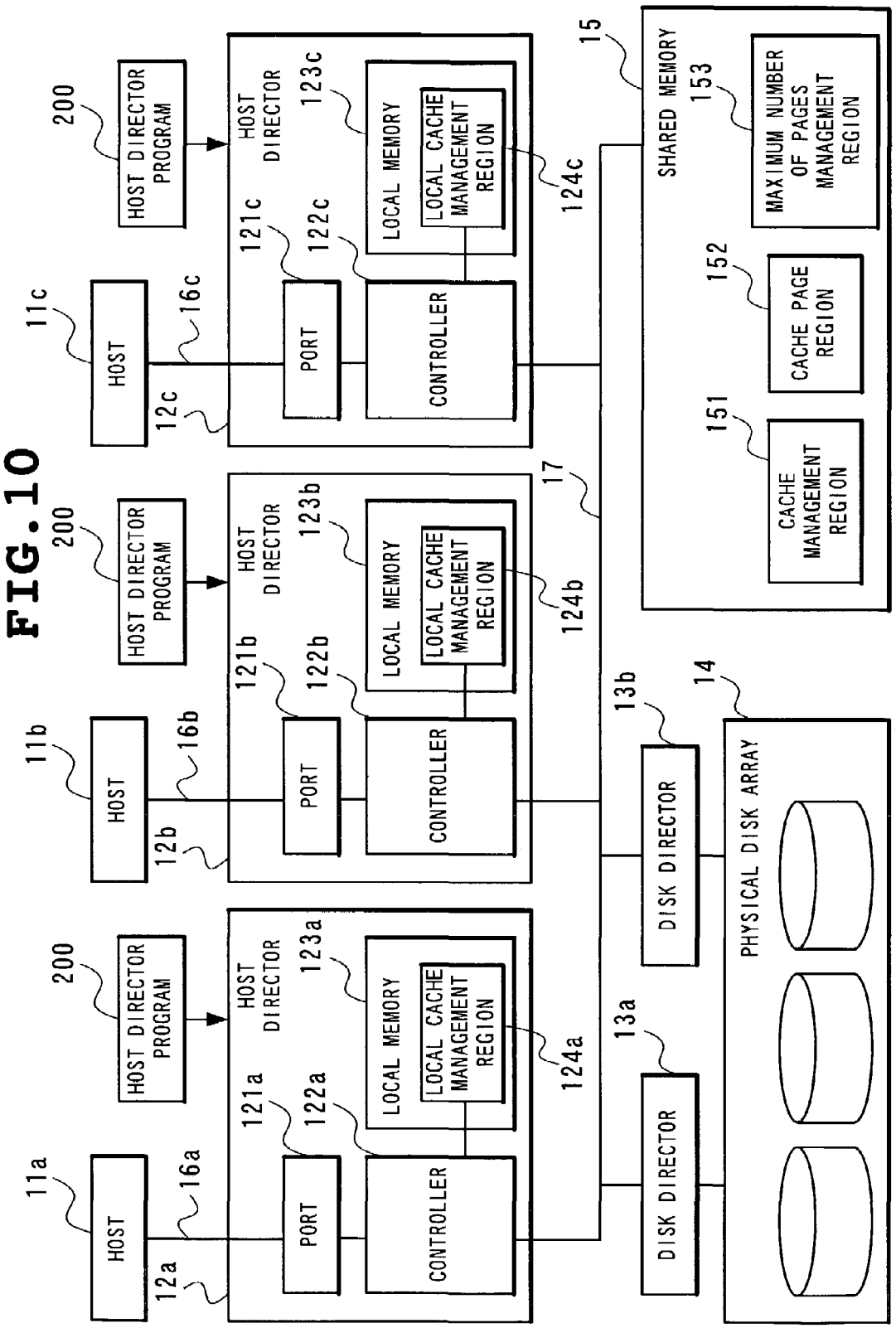

DISK CACHE MANAGEMENT METHOD OF DISK ARRAY DEVICE

BACKGROUND OF THE INVENTION

1. Field of the Invention

The present invention relates to a disk cache management method of a disk array device and, more particularly, to a disk cache management method of a disk array device mounted with a plurality of host directors (also called host adaptor) and a memory serving as a disk cache shared by these host directors (hereinafter referred to as shared memory).

2. Description of the Related Art

A disk array device mounted with a plurality of host directors in general has a shared memory of a large capacity mounted thereon for use as a disk cache. When a read command received from a host computer (hereinafter simply referred to as host) hits the cache, data can be transferred to the host without mechanical operation of a physical disk, so that a rapid response is possible. Also when receiving a write command, a fast response is enabled by ending the write command at a time when data is written to the disk cache and then writing the data to the physical disk later.

The above-described conventional technique, however, only has a rapid response as compared with mechanical operation of a physical disk and depending on a load on an application of a host, a faster response might be demanded.

Out of a response time required at the time of cache hit, one of elements peculiar to a disk array device mounted with a plurality of host directors and a shared memory is a cache page exclusive processing time. When receiving a read/write command from the host, the host director conducts cache page opening processing prior to data transmission and reception. This processing is to conduct exclusive control of the cache page in question during data transmission and reception to prevent another host, director or other task processing of the host director in question from accessing the same cache page or conducting processing of purging a cache page in use. Conversely, after data transfer is completed, it is necessary to conduct closing processing of the cache page in question in order to make the cache page be accessible by another host director or other task processing of the host director in question and be a target of LRU (Least Recently Used) control.

Opening processing and closing processing of a cache page are conducted by updating cache management information on a shared memory. While time for accessing the shared memory should be inevitably increased in hardware as the disk array device is increased in scale to have the number of host directors and the capacity of the shared memory increased, port performance and director performance improve rapidly, so that the processing is relatively bottlenecking performance. As a result, in command processing at the time of cache hit, time required for cache page opening processing and closing processing is too long to be negligible.

Among related conventional art is Japanese Patent Laying-Open (Kokai) No. 2000-267815. "Disk Array Controller" disclosed in the literature includes a plurality of units as an interface with a host computer/a disk device, duplexed shared memory units each one-to-one connected to each interface unit through an access path, a selector connected to the plurality of interface units and a cache memory connected to the selector, in which with the number of access paths between the plurality of interface units and the selector set to be more than the number of access paths between the cache memory and the selector, processors of the plurality of interface units conduct double write to the duplexed shared memory unit. The conventional art, however, fundamentally differs from the present invention in structure and function in that a local memory fails to have a local search table, a local management information entry and the like.

SUMMARY OF THE INVENTION

An object of the present invention is to provide a disk cache management method of a disk array device which eliminates a performance bottleneck to drastically improve cache page access response performance by thinning out the number of accesses to a shared memory involved in opening processing and closing processing of a cache page.

According to the first aspect of the invention, a disk cache management method of a disk array device mounted with a plurality of host directors and a shared memory shared by the host directors and serving as a disk cache, wherein each host director is mounted with a local memory, each local memory having a local cache management region for managing a cache page at a steady open state on the shared memory, and which comprises the step of after subjecting a cache page on the shared memory to opening processing and finishing using the cache page, releasing a state of in-use of the cache page in question only on the local cache management region, and on the shared memory, bringing the cache page in question to a steady open state where the cache page remains open without being subjected to closing processing.

According to the second aspect of the invention, a disk cache management method of a disk array device mounted with a plurality of host directors and a shared memory shared-by the host directors and having a cache page region and a cache management region, wherein each host director is mounted with a local memory, each local memory having a local cache management region for managing a cache page at a steady open state on the shared memory, and which comprises a cache page opening step of, at the reception of a read/write command from a host, when a cache page in question is not in use, setting the cache page in question to be in use in a shared management information entry on the cache management region, as well as assigning a local management information entry on the local cache management region to set the cache page in question to be in use in the local management information entry in question, when the cache page in question is being used by other host director, accumulating its own host director identifier in a queue of the shared management information entry in question and after transmitting a request for closing the cache page in question to other host director, setting the cache page in question to be in use in the shared management information entry in question, as well as assigning the local management information entry in question to set the cache page in question to be in use in the local management information entry in question, and when the cache page in question is being used by its own host director, setting the cache page in question to be in use in the local management information entry in question while omitting the processing of setting the cache page in question to be in use in the shared management information entry in question, a cache page closing step of, after finishing using the cache page in question, checking contention for the use of the cache page in question with reference to the queue of the shared management information entry in question, and when there is contention, releasing a state of in-use of the cache page in question in the shared management information entry in question, as well as releasing assignment of the local management information entry in question and when there is no contention, without releasing the in-use state of the cache page in question in the shared management information entry in question, releasing the in-use state of the cache page in question in the local management information entry in question to bring the cache page in question to a steady open state where the cache page in question remains open, and a closing request reception step of, at the reception of a request for closing the cache page in question from other host director, when the cache page in question is not in use, releasing the in-use state of the cache page in question in the shared management information entry in question, as well as releasing the assignment of the local management information entry in question.

In the preferred construction, the local cache management region is provided with a local assignment link counter for counting the number of local management information entries linked to the local assignment link, and which comprises the step of, when in the cache page closing processing, a count value of the local assignment link counter exceeds a maximum number of pages of cache pages at the steady open state which are set to be in use in the shared management information entry and released from the in-use state in the local management information entry, purging the local management information entry in question from the local assignment link by LRU control to link in the local assignment link and releasing the in-use state of the cache page in question in the shared management information in question.

In another preferred construction, the shared management information entry includes an assigned address indicative of which data on a physical disk array is assigned to a cache page, a forward pointer and a backward pointer for setting up a link with a shared search table, a forward pointer and a backward pointer for forming a shared assignment link or a shared non-assignment link which is a bidirectional link with a shared assignment link MRU pointer and a shared assignment link LRU pointer, or a shared non-assignment link MRU pointer and a shared non-assignment link LRU pointer as start points, in-use information for registering an in-use flag and a host director identifier, and a queue for accumulating a host director identifier of other host director waiting for use of the cache page in question.

In another preferred construction, the local management information entry includes an assigned address indicative of which data on a physical disk array is assigned to a cache page, a page identifier of the cache page in question, a forward pointer and a backward pointer for setting up a link with a local search table, a forward pointer and a backward pointer for forming a local assignment link or a local non-assignment link which is a bidirectional link with a local assignment link MRU pointer and a local assignment link LRU pointer, or a local non-assignment link MRU pointer and a local non-assignment link LRU pointer as start points, in-use information for registering an in-use flag and a task identifier, and a queue for accumulating a task identifier of other processing task waiting for use of the cache page in question.

According to the third aspect of the invention, a disk cache management method of a disk array device including a physical disk array, at least one disk director, a plurality of host directors and a shared memory shared by the disk director and the host directors, with a cache management region on the shared memory provided to have a shared management information entry one-to-one-corresponding to a cache page cached in a cache page region on the shared memory, a shared search table for searching all the shared management information entries for a shared management information entry assigned to a cache page by using an address, a shared assignment link MRU pointer and a shared assignment link LRU pointer as start points of a shared assignment link bidirectionally linking a shared management information entry which is assigned to a cache page but not in use among all the shared management information entries, and a shared non-assignment link MRU pointer and a shared non-assignment link LRU pointer as start points of a shared non-assignment link bidirectionally linking a shared management information entry which is yet to be assigned to a cache page among all the shared management information entries, wherein each host director is mounted with a local memory, a local cache management region on each local memory having a local management information entry one-to-one-corresponding to a cache page cached in the cache page region on the shared memory, a local search table for forming a link so as to make a local management information entry assigned to a cache page be searchable by an address among all the local management information entries, a local assignment link MRU pointer and a local assignment link LRU pointer as start points for forming a local assignment link bidirectionally linking a local management information entry which is assigned to a cache page but not in use among all the local management information entries, and a local non-assignment link MRU pointer and a local non-assignment link LRU pointer as start points for forming a local non-assignment link bidirectionally linking a local management information entry which is yet to be assigned to a cache page among all the local management information entries, and cache page opening processing includes the steps of a) when receiving a read/write command from a host, searching the shared search table for a shared management information entry being assigned to a cache page in question corresponding to an address in question, b) when no shared management information entry is assigned, assigning a shared management information entry to the cache page in question, setting the cache page in question to be in use in the shared management information entry in question, assigning a local management information entry to the cache page in question and setting the cache page in question to be in use in the local management information entry in question, c) when a shared management information entry is assigned, checking whether the cache page in question is in use in the shared management information entry in question, d) when the cache page in question is not in use, setting the cache page in question to be in use in the shared management information entry in question, assigning a local management information entry to the cache page in question and setting the cache page in question to be in use in the local management information entry in question, e) when the cache page in question is being used by other host director, conducting accumulation in a queue of the shared management information entry in question, requesting closing of the cache page in question from other host director, waiting for a state of in-use of the cache page in question to be released in the shared management information entry in question to set the cache page in question to be in use in the shared management information entry in question, assigning a local management information entry to the cache page in question and setting the cache page in question to be in use in the local management information entry in question, f) when the cache page in question is being used by its own host director, checking contention for the use of the cache page in question with reference to the queue of the shared management information entry in question, g) when contention for the use of the cache page in question exists in the shared management information entry in question, conducting accumulation in the queue of the shared management information entry in question, waiting for the in-use state of the cache page in question to be released in the shared management information entry in question to set the cache page in question to be in use in the shared management information entry in question, assigning a local management information entry to the cache page in question and setting the cache page in question to be in use in the local management information entry in question, h) when no contention for the use of the cache page in question exists in the shared management information entry in question, searching the local search table for the local management information entry in question and checking contention for the use of cache page in question in the local management information entry in question, i) when contention for the use of the cache page in question exists in the local management information entry in question, conducting accumulation in a queue of the local management information entry in question and waiting for the in-use state of the cache page in question to be released in the local management information entry in question to set the cache page in question to be in use in the local management information entry in question, and j) when there exists no contention for the use of the cache page in question in the local management information entry in question, setting the cache page in question to be in use in the local management information entry in question without setting the cache page in question to be in use in the shared management information entry in question.

In the preferred construction, cache page closing processing includes the steps of when data transfer between the host and the cache page region is completed in processing of a read/write command from the host, checking contention for the use of a cache page in question with reference to the queue of the shared management information entry in question, when contention exists, releasing the in-use state of the cache page in question in the shared management information entry in question and releasing assignment of the local management information entry in question, and when no contention for use exists, searching the local search table for the local management information entry in question to release the in-use state of the cache page in question in the local management information entry in question, and closing request reception processing includes the steps of when receiving a cache page closing request from other host director, searching the local search table for the local management information entry in question, when the local management information entry in question is searched, checking the in-use state of the cache page in question in the local management information entry in question, and when the cache page in question is not in use, releasing the in-use state of the cache page in question in the shared management information entry in question and releasing assignment of the local management information entry in question.

In another preferred construction, the local cache management region is provided with a local assignment link counter for counting the number of local management information entries linked to the local assignment link, and the cache page closing processing includes the step of, when a count value of the local assignment link counter exceeds a maximum number of cache pages at a steady open state which are set to be in use in the shared management information entry and released from the in-use state in the local management information entry, purging the local management information entry in question from the local assignment link by LRU control to link in the local assignment link and releasing the in-use state of the cache page in question in the shared management information in question.

In another preferred construction, the maximum number of cache pages at the steady open state is determined by dividing a certain rate of the entire cache page as a maximum rate of cache pages at the steady open state by the number of host directors mounted.

In another preferred construction, the maximum number of cache pages at the steady open state is a value obtained by multiplying a certain rate of the entire cache page as a maximum rate of cache pages at the steady open state by a rate of the own host director access frequency to the entire access frequency.

In another preferred construction, the maximum number of cache pages at the steady open state is a value obtained by further multiplying, by a weight of priority, a value which is obtained by multiplying a certain rate of the entire cache page as a maximum rate of cache pages at the steady open state by a rate of the own host director access frequency to the entire access frequency.

In another preferred construction, the shared management information entry includes an assigned address indicative of which data on the physical disk array is assigned to a cache page, a forward pointer and a backward pointer for setting up a link with the shared search table, a forward pointer and a backward pointer for forming the shared assignment link or the shared non-assignment link which is a bidirectional link with the shared assignment link MRU pointer and the shared assignment link LRU pointer, or the shared non-assignment link MRU pointer and the shared non-assignment link LRU pointer as start points, in-use information for registering an in-use flag and a host director identifier, and a queue for accumulating a host director identifier of other host director waiting for use of the cache page in question.

In another preferred construction, the local management information entry includes an assigned address indicative of which data on the physical disk array is assigned to a cache page, a page identifier of the cache page in question, a forward pointer and a backward pointer for setting up a link with the local search table, a forward pointer and a backward pointer for forming the local assignment link or the local non-assignment link which is a bidirectional link with the local assignment link MRU pointer and the local assignment link LRU pointer, or the local non-assignment link MRU pointer and the local non-assignment link LRU pointer as start points, in-use information for registering an in-use flag and a task identifier, and a queue for accumulating a task identifier of other processing task waiting for use of the cache page in question.

According to another aspect of the invention, a disk array device mounted with a plurality of host directors and a shared memory shared by the host directors and serving as a disk cache, wherein each host director includes a port connected to a host, a controller connected to the host through the port and to the shared memory through a bus, and a local memory connected to the controller and provided with a local cache management region for managing a cache page at a steady open state on the shared memory.

In the preferred construction, the shared management information entry includes an assigned address indicative of which data on a physical disk array is assigned to a cache page, a forward pointer and a backward pointer for setting up a link with a shared search table, a forward pointer and a backward pointer for forming a shared assignment link or a shared non-assignment link which is a bidirectional link with a shared assignment link MRU pointer and a shared assignment link LRU pointer, or a shared non-assignment link MRU pointer and a shared non-assignment link LRU pointer as start points, in-use information for registering an in-use flag and a host director identifier, and a queue for accumulating a host director identifier of other host director waiting for use of the cache page in question.

In another preferred construction, the local management information entry includes an assigned address indicative of which data on a physical disk array is assigned to a cache page, a page identifier of the cache page in question, a forward pointer and a backward pointer for setting up a link with a local search table, a forward pointer and a backward pointer for forming a local assignment link or a local non-assignment link which is a bidirectional link with a local assignment link MRU pointer and a local assignment link LRU pointer, or a local non-assignment link MRU pointer and a local non-assignment link LRU pointer as start points, in-use information for registering an in-use flag and a task identifier, and a queue for accumulating a task identifier of other processing task waiting for use of the cache page in question.

According to another aspect of the invention, a disk array device including a physical disk array, at least one disk director, a plurality of host directors and a shared memory shared by the disk director and the host directors, with a cache management region on the shared memory provided to have a shared management information entry one-to-one-corresponding to a cache page cached in a cache page region on the shared memory, a shared search table for forming a link so as to make a shared management information entry assigned to a cache page be searchable by an address among all the shared management information entries, a shared assignment link MRU pointer and a shared assignment link LRU pointer as start points for forming a shared assignment link bidirectionally linking a shared management information entry which is assigned to a cache page but not in use among all the shared management information entries, and a shared non-assignment link MRU pointer and a shared non-assignment link LRU pointer as start points for forming a shared non-assignment link bidirectionally linking a shared management information entry which is yet to be assigned to a cache page among all the shared management information entries, wherein each host director is mounted with a local memory, a local cache management region on the local memory having a local management information entry one-to-one-corresponding to a cache page cached in the cache page region on the shared memory, a local search table for forming a link so as to make a local management information entry assigned to a cache page be searchable by an address among all the local management information entries, a local assignment link MRU pointer and a local assignment link LRU pointer as start points for forming a local assignment link bidirectionally linking a local management information entry which is assigned to a cache page but not in use among all the local management information entries, and a local non-assignment link MRU pointer and a local non-assignment link LRU pointer as start points for forming a local non-assignment link bidirectionally linking a local management information entry which is yet to be assigned to a cache page among all the local management information entries.

In the preferred construction, the shared management information entry includes an assigned address indicative of which data on the physical disk array is assigned to a cache page, a forward pointer and a backward pointer for setting up a link with the shared search table, a forward pointer and a backward pointer for forming the shared assignment link or the shared non-assignment link which is a bidirectional link with the shared assignment link MRU pointer and the shared assignment link LRU pointer, or the shared non-assignment link MRU pointer and the shared non-assignment link LRU pointer as start points, in-use information for registering an in-use flag and a host director identifier, and a queue for accumulating a host director identifier of other host director waiting for use of the cache page in question.

In another preferred construction, the local management information entry includes an assigned address indicative of which data on the physical disk array is assigned to a cache page, a page identifier of the cache page in question, a forward pointer and a backward pointer for setting up a link with the local search table, a forward pointer and a backward pointer for forming the local assignment link or the local non-assignment link which is a bidirectional link with the local assignment link MRU pointer and the local assignment link LRU pointer, or the local non-assignment link MRU pointer and the local non-assignment link LRU pointer as start points, in-use information for registering an in-use flag and a task identifier, and a queue for accumulating a task identifier of other processing task waiting for use of the cache page in question.

According to another aspect of the invention, a program for conducting disk cache management of a disk array device mounted with a plurality of host directors and a shared memory shared by the host directors and serving as a disk cache, which executes a cache page opening function of when receiving a read/write command from a host, when a cache page in question is not in use, setting the cache page in question to be in use in a shared management information entry on the cache management region, as well as assigning a local management information entry on the local cache management region to set the cache page in question to be in use in the local management information entry in question, when the cache page in question is being used by other host director, accumulating its own host director identifier in a queue of the shared management information entry in question and after transmitting a request for closing the cache page in question to other host director, setting the cache page in question to be in use in the shared management information entry in question, as well as assigning the local management information entry in question to set the cache page in question to be in use in the local management information entry in question, and when the cache page in question is being used by its own host director, setting the cache page in question to be in use in the local management information entry in question while omitting processing of setting the cache page in question in use in the shared management information entry in question, a cache page closing function of after completing the use of the cache page in question, referring to the queue of the shared management information entry in question to check contention for the use of the cache page in question, when contention exits, releasing the in-use state of the cache page in question in the shared management information entry in question, as well as releasing the assignment of the local management information entry in question, and when no contention exists, without releasing the in-use state of the cache page in question in the shared management information entry in question, releasing the in-use state of the cache page in question in the local management information entry in question to bring the cache page in question to a steady open state where the cache page remains open, and a closing request reception function of, at the reception of a request for closing the cache page in question from other host director, when the cache page in question is not in use, releasing the in-use state of the cache page in question in the shared management information entry in question, as well as releasing the assignment of the local management information entry in question.

According to a further aspect of the invention, a program for conducting disk cache management of a disk array device mounted with a plurality of host directors and a shared memory shared by the host directors and serving as a disk cache, which executes a cache page opening function including the steps of when receiving a read/write command from a host, searching a shared search table for a shared management information entry being assigned to a cache page in question corresponding to an address in question, when no shared management information entry is assigned, assigning a shared management information entry to the cache page in question, setting the cache page in question to be in use in the, shared management information entry in question, assigning a local management information entry to the cache page in question and setting the cache page in question to be in use in the local management information entry in question, when a shared management information entry is assigned, checking whether the cache page in question is in use in the shared management information entry in question, when the cache page in question is not in use, setting the cache page in question to be in use in the shared management information entry in question, assigning a local management information entry to the cache page in question, and setting the cache page in question to be in use in the local management information entry in question, when the cache page in question is being used by other host director, conducting accumulation in a queue of the shared management information entry in question, requesting closing of the cache page in question from other host director, waiting for the in-use state of the cache page in question to be released in the shared management information entry in question to set the cache page in question to be in use in the shared management information entry in question, assigning a local management information entry to the cache page in question and setting the cache page in question to be in use in the local management information entry in question, when the cache page in question is being used by its own host director, checking contention for use of the cache page in question with reference to the queue of the shared management information entry in question, when contention for use of the cache page in question exists in the shared management information entry in question, conducting accumulation in the queue of the shared management information entry in question, waiting for the in-use state of the cache page in question to be released in the shared management information entry to set the cache page in question to be in use in the shared management information entry, assigning a local management information entry to the cache page in question and setting the cache page in question to be in use in the local management information entry in question, when no contention for use of the cache page in question exists in the shared management information entry in question, searching the local search table for the local management information entry in question and checking contention for use of the cache page in question in the local management information entry in question, when contention for use of the cache page in question exists in the local management information entry in question, conducting accumulation in a queue of the local management information entry in question and waiting for the in-use state of the cache page in question to be released in the local management information entry in question to set the cache page in question to be in use in the local management information entry in question, and when no contention for use of the cache page in question exists in the local management information entry in question, setting the cache page in question to be in use it the local management information entry in question without setting the cache page in question to be in use in the shared management information entry in question, a cache page closing function including the steps of when completing data transfer between a host and a cache page region in the processing of a read/write command from the host, checking contention for use of a cache page in question with reference to the queue of the shared management information entry in question, when contention exits, releasing the in-use state of the cache page in question in the shared management information entry in question and releasing the assignment of the local management information entry in question, and when no contention exists, searching the local search table for the local management information entry in question to release the in-use state of the cache page in question in the local management information entry in question, and a closing request reception function including the steps of when receiving a request for closing a cache page, from other host director, searching the local search table for a local management information entry in question, when the local management information entry in question is searched, checking the state of use of the cache page in question in the local management information entry in question, and when the cache page in question is not in use, releasing the in-use state of the cache page in question in the shared management information entry in question and releasing the assignment of the local management information entry in question.

According to the disk cache management method of a disk array device according to the present invention, even after data transfer is completed after use of a cache page is finished which has been subjected to opening processing, the cache page in question is kept at a steady open state in which the cache page in question remains open without closing processing and when an access to the cache page in question is made by the same host director, opening processing of the cache page in question can be omitted because the cache page in question is already open. As a result, closing processing and opening processing of a cache page on a shared memory whose access time is relatively long are omitted one time each to reduce an average response time.

In order to realize the above-described effect, each host director needs to have a local cache management region for managing a cache page at the steady open state on a local memory whose access time is short. The local cache management region should have a local management information entry large enough for coping with a cache page at the steady open state and the local management information entry should form a local assignment link. The host director conducts LRU management of a cache page at the steady open state by using the local cache management region. More specifically, when newly adding a cache page at the steady open state, the host director in question limits the number of cache pages at the steady open state to a maximum number of pages by purging the oldest cache page among cache pages at the steady open state in an access history from the steady open state. In addition, for a case where other host director wants to use a cache page at the steady open state, a procedure for communicating a cache page closing request is required. Maximum number of cache pages at the steady open state should be determined by dividing a certain rate of the total cache pages as a maximum rate of the cache pages at the steady open state by the number of host directors mounted.

The above-described structure enables the host director to manage, after a cache page is used, the steady open state of the cache page in question on a cache memory in the local cache management region on the local memory without conducting processing of closing the cache page in question as a state on the shared memory. Conversely, when using a cache page at the steady open state, since it is open as a state on the shared memory, cache page opening processing is completed by the management of only a state on the local memory without changing the state on the shared memory. Also conduct LRU control of a cache page at the steady open state in order to make the number of cache pages at the steady open state be within a maximum number of pages and then in order to increase a hit rate of cache pages at the steady open state. As a result of such control, the number of accesses to the shared memory in the processing conducted at the time of cache hit can be cut off to reduce an average response time, thereby improving performance.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 8 is a diagram showing contents of a maximum number of pages management region provided on a shared memory for the purpose of dynamically managing the maximum number of cache pages at the steady open state in the second embodiment;

FIG. 9 is a block diagram showing a structure of a disk array device to which a disk cache management method according to a third embodiment of the present invention is applied; and FIG. 10 is a block diagram showing a structure of a disk array device to which a disk cache management method according to a fourth embodiment of the present invention is applied.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

[First Embodiment]

Figure 1:
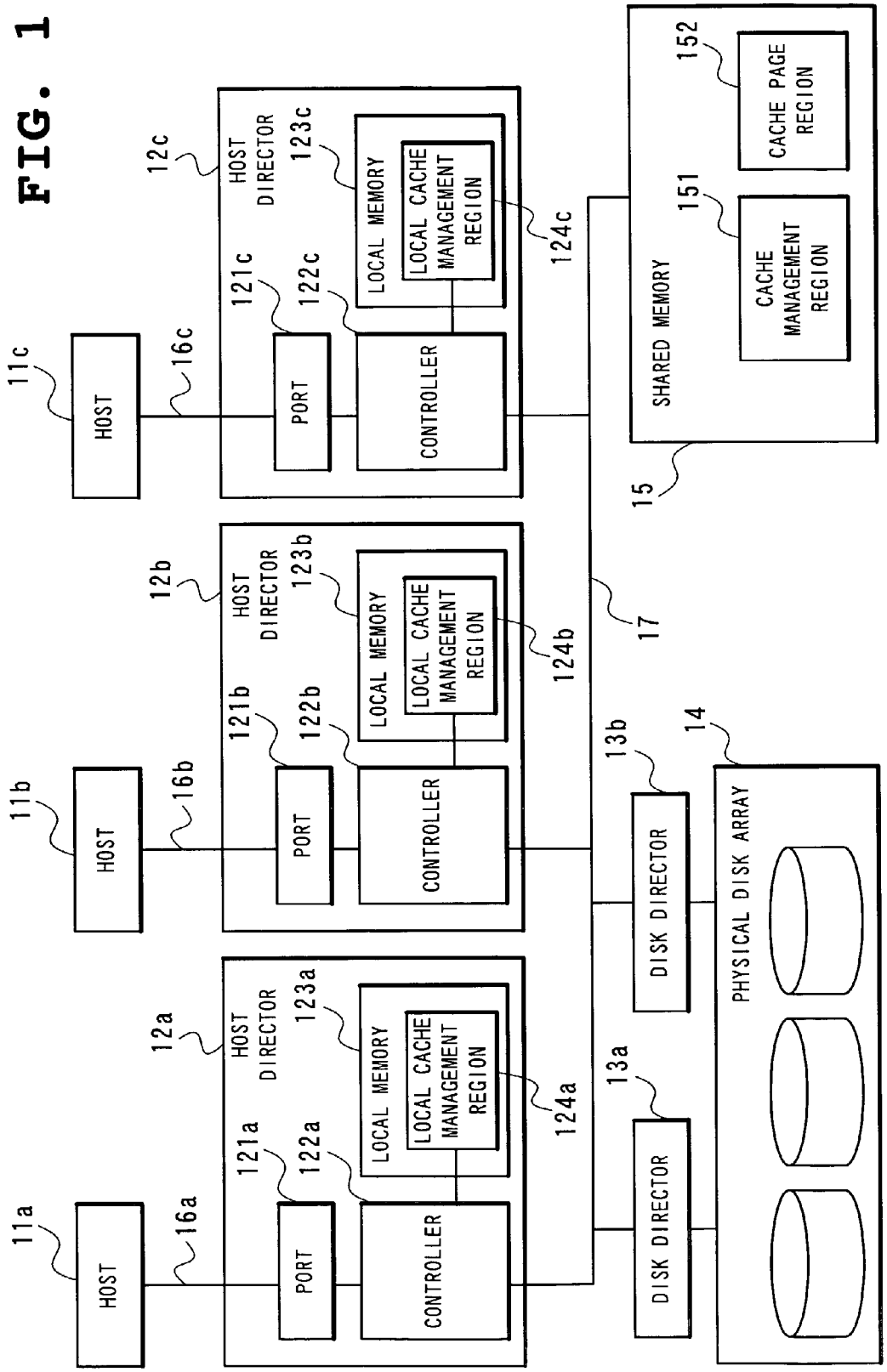
FIG. 1 is a block diagram showing a structure of a disk array device to which a disk cache management method according to a first embodiment of the present invention is applied.

FIG. 1 is a block diagram showing a structure of a disk array device to which a disk cache management method according to a first embodiment of the present invention is applied. The disk array device includes, as main components, a plurality (three illustrated in the figure) of host directors 12a, 12b and 12c to which a plurality (three illustrated in the figure) of hosts 11a, 11b, 11c are connected through channels 16a, 16b and 16c, respectively, a plurality (two illustrated in the figure) of disk directors 13a and 13b connected to the host directors 12a, 12b and 12c through a bus 17, a physical disk array 14 connected to the disk directors 13a and 13b, and a shared memory 15 connected to the host directors 12a, 12b and 12c and the disk directors 13a and 13b through the bus 17.

The host directors 12a, 12b and 12c are composed of ports 121a, 121b and 121c, controllers 122a, 122b and 122c and local memories 123a, 123b and 123c, respectively.

The ports 121a, 121b and 121c are connected to the hosts 11a, 11b and 11c through the channels 16a, 16b and 16c, respectively.

With a microcomputer program ROM (Read Only Memory) etc. contained, the controllers 122a, 122b and 122c are capable of conducting parallel processing and connected to the ports 121a, 121b and 121c and the local memories 123a, 123b and 123c, as well as to the shared memory 15 through the bus 17. As a result, the controllers 122a, 122b and 122c are allowed to access the local memories 123a, 123b and 123c at a high speed, as well as accessing the shared memory 15 through the bus 17.

The local memories 123a, 123b and 123c are connected to the controllers 122a, 122b and 122c, respectively.

The shared memory 15 has a cache page region 152 for holding data as a cache page and a cache management region 151 for managing a cache page on the cache page region 152. Although the shared memory 15 is accessible from all the host directors 12a, 12b and 12c, its access speed is naturally lower than that of the local memories 123a, 123b and 123c.

The channels 16a, 16b and 16c are each formed of, for example, an SCSI (Small Computer System Interface), a fiber channel or the like.

The bus 17 is formed of a cross-bar switch, a fiber channel or the like.

Figure 2:
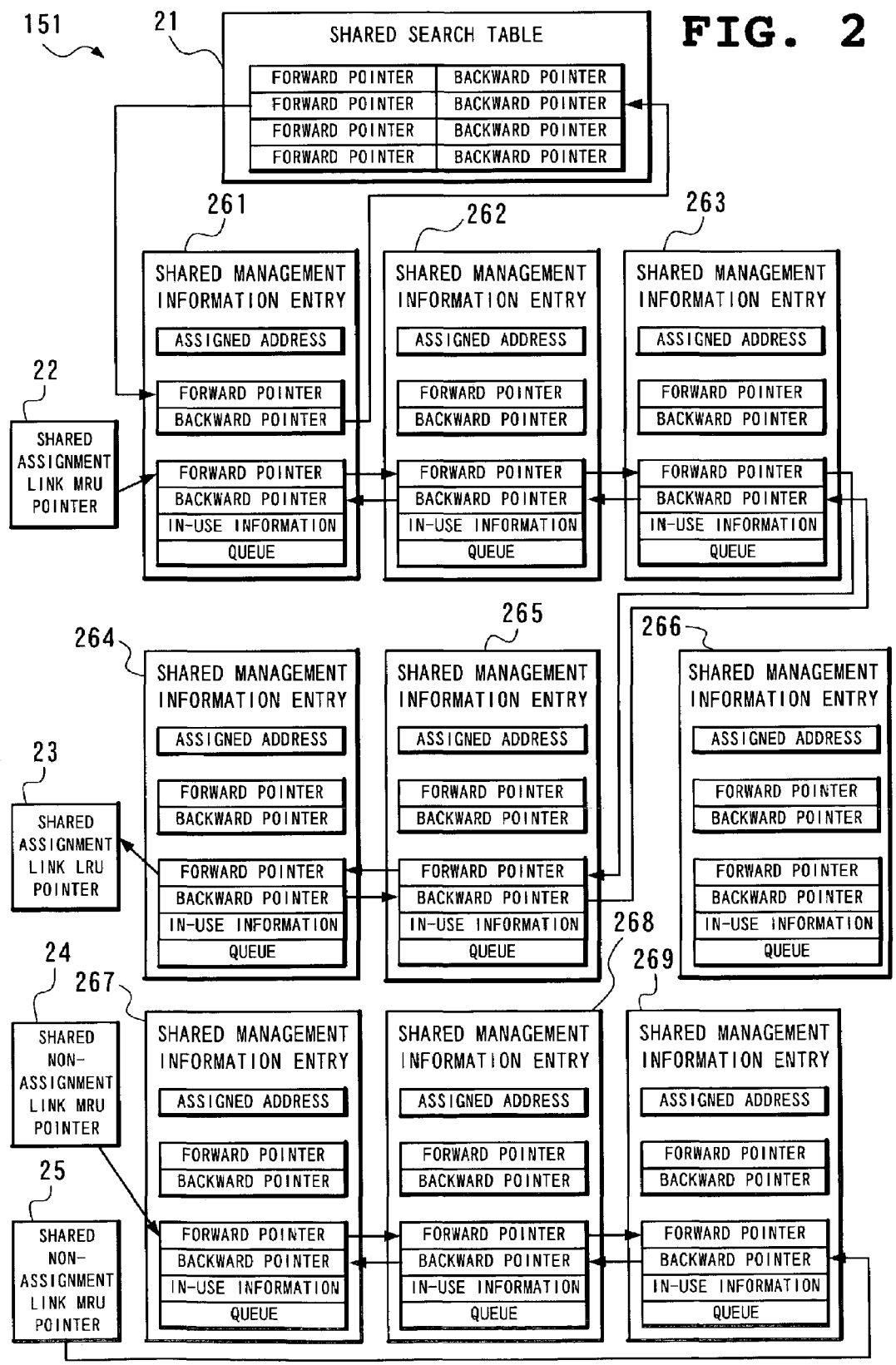
FIG. 2 is a diagram showing contents of a cache management region on a shared memory illustrated in FIG. 1.

FIG. 2 is a diagram showing the contents of the cache management region 151 on the shared memory 15 in more detail. The cache management region 151 is provided with shared management information entries 261 to 269 one-to-one corresponding to a cache page cached in the cache page region 152 on the shared memory 15, a shared search table 21 for forming a link such that the shared management information entries 261 to 266 actually assigned to cache pages among the shared management information entries 261 to 269 can be searched using an address, a shared assignment link MRU (Most Recently Used) pointer 22 and a shared assignment link LRU pointer 23 as start points for forming a shared assignment link [22, . . . , 23] which bidirectionally links the shared management information entries 261 to 265 which are assigned to cache pages but not in use among the shared management information entries 261 to 269, and a shared non-assignment link MRU pointer 24 and a shared non-assignment link LRU pointer 25 as start points for forming a shared non-assignment link [24, . . . , 25] which bidirectionally links the shared management information entries 267 to 269 yet to be assigned to cache pages among the shared management information entries 261 to 269.

Each of the shared management information entries 261 to 269 includes an assigned address indicating which data on the physical disk array 14 is assigned to a cache page, a forward pointer and a backward pointer which set up a link with the shared search table 21, a forward pointer and a backward pointer for forming the shared assignment link [22, . . . , 23] which is a bidirectional link with the shared assignment link MRU pointer 22 and the shared assignment link LRU pointer 23 as start points or the shared non-assignment link [24, . . . , 25] which is a bidirectional link with the shared non-assignment link MRU pointer 24 and the shared non-assignment link LRU pointer 25 as start points, in-use information for registering an in-use flag and a host director identifier, and a queue for accumulating host director identifiers of other host directors waiting for using a cache page in question.

The shared management information entries 261 to 265 which are assigned to cache pages but not in use among the shared management information entries 261 to 269 form the shared assignment link [22, . . . , 23] which is a bidirectional link with the shared assignment link MRU pointer 22 and the shared assignment link LRU pointer 23 as start points.

Among the shared management information entries 261 to 269, the shared management information entries 267 to 269 which are yet to be assigned to cache pages form the shared non-assignment link [24, . . . , 25] which is a bidirectional link with the shared non-assignment link MRU pointer 24 and the shared non-assignment link LRU pointer 25 as a start point.

Among the shared management information entries 261 to 269, the shared management information entries 261 to 266 actually assigned to cache pages form a link from the shared search table 21 to enable search by an address. Illustrated in FIG. 2 is a link formed only by the shared management information entry 261 from the shared search table 21 as indicated by an arrow in order to prevent the illustration from becoming complicated. In practice, the shared management information entries 262 to 266 also form a link from the shared search table 21. When in use, the shared management information entry 266 is counted out from the shared assignment link [22, . . . , 23] to be out of purging processing targets.

When a cache page in question is in use, registered in the in-use information of the shared management information entry 266 are the in-use flag and a host director identifier of a host director using the cache page. Although the in-use state at the shared management information entry 266 also includes the steady open state which seems to be in use to other host director, it does not always indicate that the cache page is actually being used in command processing.

For the shared management information entry to which a cache page in use is assigned, the queue accumulates a host director identifier reserved for next use. The host director 12 using the cache page in question selects processing to be conducted after the use by the host director identifier in the queue.

Figure 3:
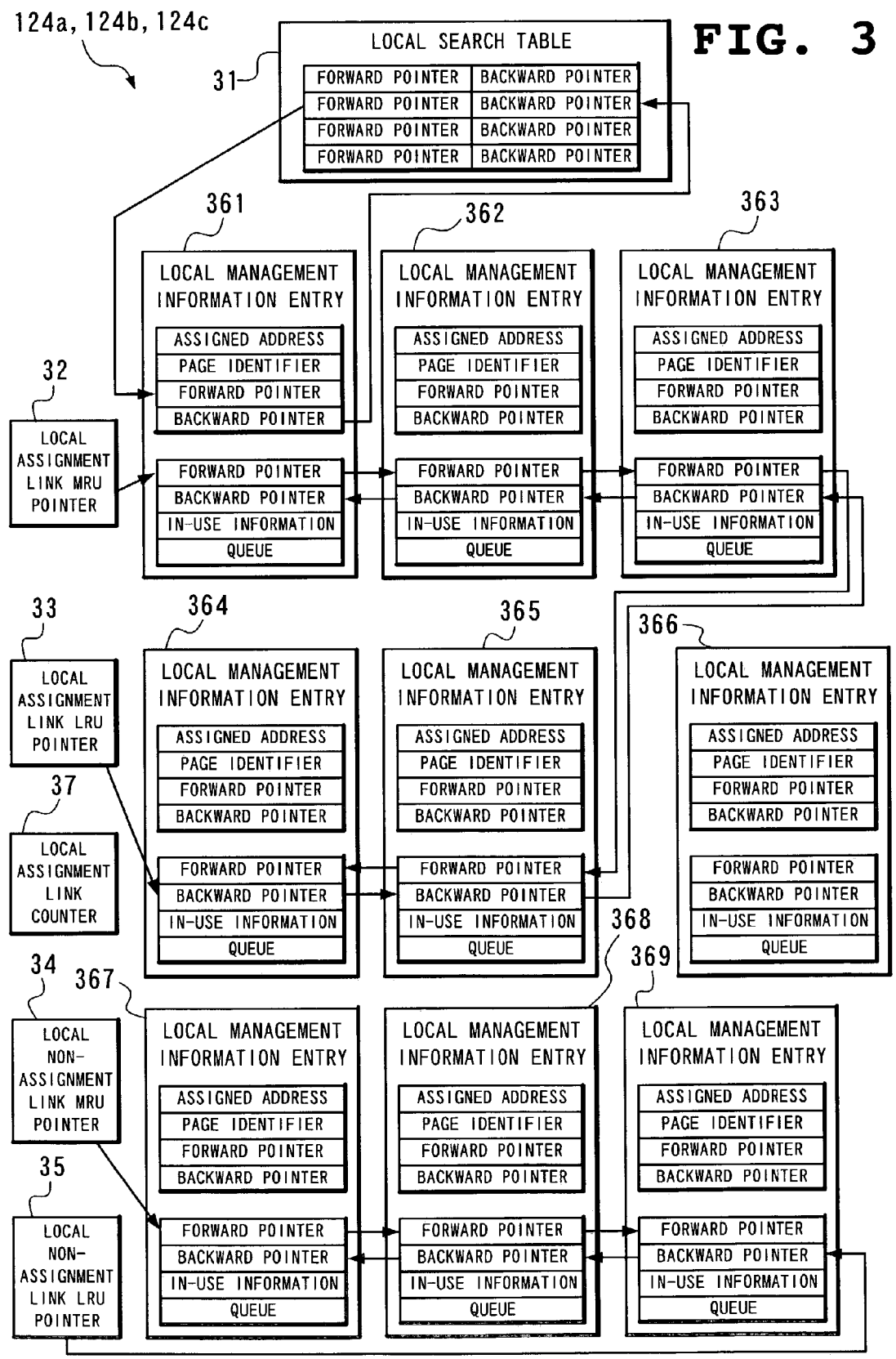
FIG. 3 is a diagram showing contents of a local cache management region on a local memory illustrated in FIG. 1.

FIG. 3 is a diagram showing the contents of local cache management regions 124a, 124b and 124c on the local memories 123a, 123b and 123c in more detail. The local cache management regions 124a, 124b and 124c are each provided with local management information entries 361 to 369 one-to-one corresponding to a cache page cached in the cache page region 152 on the shared memory 15, a local search table 31 for forming a link such that the local management information entries 361 to 366 actually assigned to cache pages among the local management information entries 361 to 369 can be searched using an address, a local assignment link MRU pointer 32 and a local assignment link LRU pointer 33 as start points for forming a local assignment link [32, . . . , 33] which bidirectionally links the local management information entries 361 to 365 which are assigned to cache pages but not in use among the local management information entries 361 to 369, a local non-assignment link MRU pointer 34 and a local non-assignment link LRU pointer 35 as start points for forming a local non-assignment link [34, . . . , 35] which bidirectionally links the local management information entries 367 to 369 yet to be assigned to cache pages among the local management information entries 361 to 369, and a local assignment link counter 37 for steadily managing the number of local management information entries linked with the local assignment link [32, . . . , 33].

Each of the local management information entries 361 to 369 dynamically corresponds to a cache page at the steady open state by the host director in question among cache pages cached in the cache page region 152 on the shared memory 15 and includes an assigned address indicating which data on the physical disk array 14 is assigned to a cache page, a page identifier indicating to which cache page the entry corresponds, a forward pointer and a backward pointer which set up a link with the local search table 31, a forward pointer and a backward pointer for forming the local assignment link [32, . . . , 33] which is a bidirectional link with the local assignment link MRU pointer 32 and the local assignment link LRU pointer 33 as start points or the local non-assignment link [34, . . . , 35] which is a bidirectional link with the local non-assignment link MRU pointer 34 and the local non-assignment link LRU pointer 35 as start points, in-use information for registering an in-use flag and a task identifier, and a queue for accumulating a task identifier of other task processing waiting for use of the cache page in question.

The local management information entries 361 to 365 which are assigned to cache pages but not in use among the local management information entries 361 to 369 form the local assignment link [32, . . . , 33] which is a bidirectional link with the local assignment link MRU pointer 32 and the local assignment link LRU pointer 33 as start points. As to the local assignment link [32, . . . , 33], the number of the linked local management information entries is constantly managed by the local assignment link counter 37.

Among the local management information entries 361 to 369, the local management information entries 367 to 369 which are yet to be assigned to cache pages form the local non-assignment link [34, . . . , 35] which is a bidirectional link with the local non-assignment link MRU pointer 34 and the local non-assignment link LRU pointer 35 as start points.

Among the local management information entries 361 to 369, the local management information entries 361 to 366 actually assigned to cache pages form a link from the local search table 31 to enable search by an address. Illustrated in FIG. 3 is a link formed only by the local management information entry 361 from the local search table 31 as indicated by an arrow in order to prevent the illustration from becoming complicated. In practice, the local management information entries 362 to 366 also form a link from the local search table 31. When in use, the local management information entry 366 is counted out from the local assignment link [32, . . . , 33] to be out of targets of purging processing.

When a cache page in question is in use, registered in the in-use information of the local management information entry 366 are the in-use flag and a task identifier of a processing task using the cache page. At this time, the in-use information of each of the local management information entries 361 to 369 indicates that the cache page in question is actually being used by a certain processing task in its own host director.

For the local management information entry 366 to which a cache page in use is assigned, the queue accumulates a task identifier of a processing task reserved for next use. The processing task using the cache page in question selects processing to be conducted after the use according to the task identifier in the queue.

Figure 4:
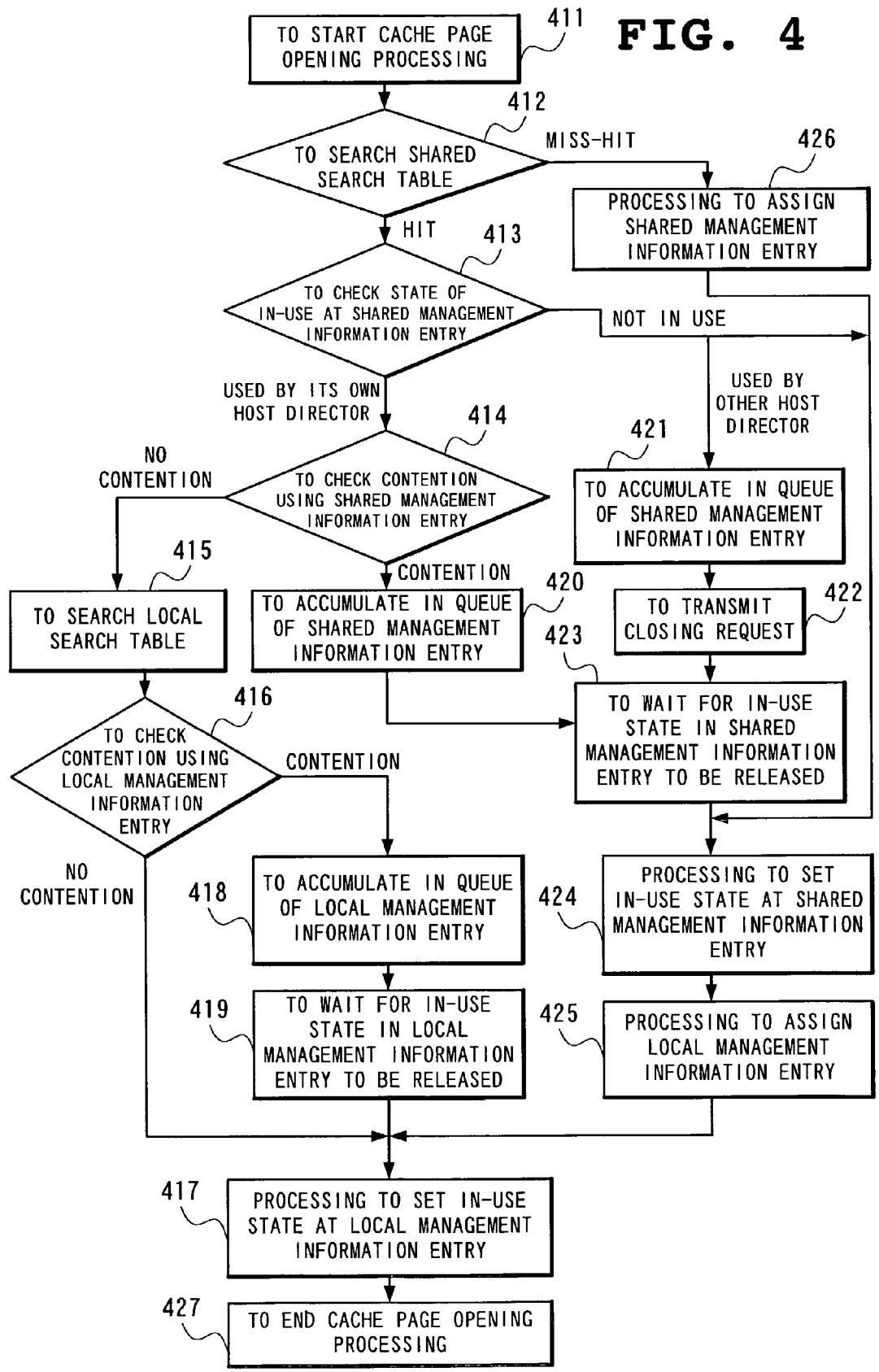
FIG. 4 is a flow chart showing opening processing of a cache page in a host director when receiving a read/write command from a host in the disk array device to which the disk cache management method according to the first embodiment of the present invention is applied.

FIG. 4 is a flow chart showing cache page opening processing at the host director when receiving a read/write command from the host in the disk array device to which the disk cache management method according to the first embodiment is applied. The cache page opening processing includes Step 411 of starting the cache page opening processing, Step 412 of searching the shared search table, Step 413 of checking a state of in-use in a shared management information entry, Step 414 of checking contention in the shared management information entry, Step 415 of searching the local search table, Step 416 of checking contention in the local management information entry, Step 417 of processing of setting the state of in-use in the local management information entry, Step 418 of accumulation in the queue of the local management information entry, Step 419 of waiting for the in-use state in the local management information entry to be released, Step 420 of accumulation in the queue of the shared management information entry, Step 421 of accumulation in the queue of a shared management information entry, Step 422 of transmitting a closing request, Step 423 of waiting for the in-use state in the shared management information entry to be released, Step 424 of processing of setting the state of in-use in the shared management information entry, Step 425 of processing of assigning the local management information entry, Step 426 of processing of assigning the shared management information entry, and Step 427 of ending cache page opening processing.

Figure 5:
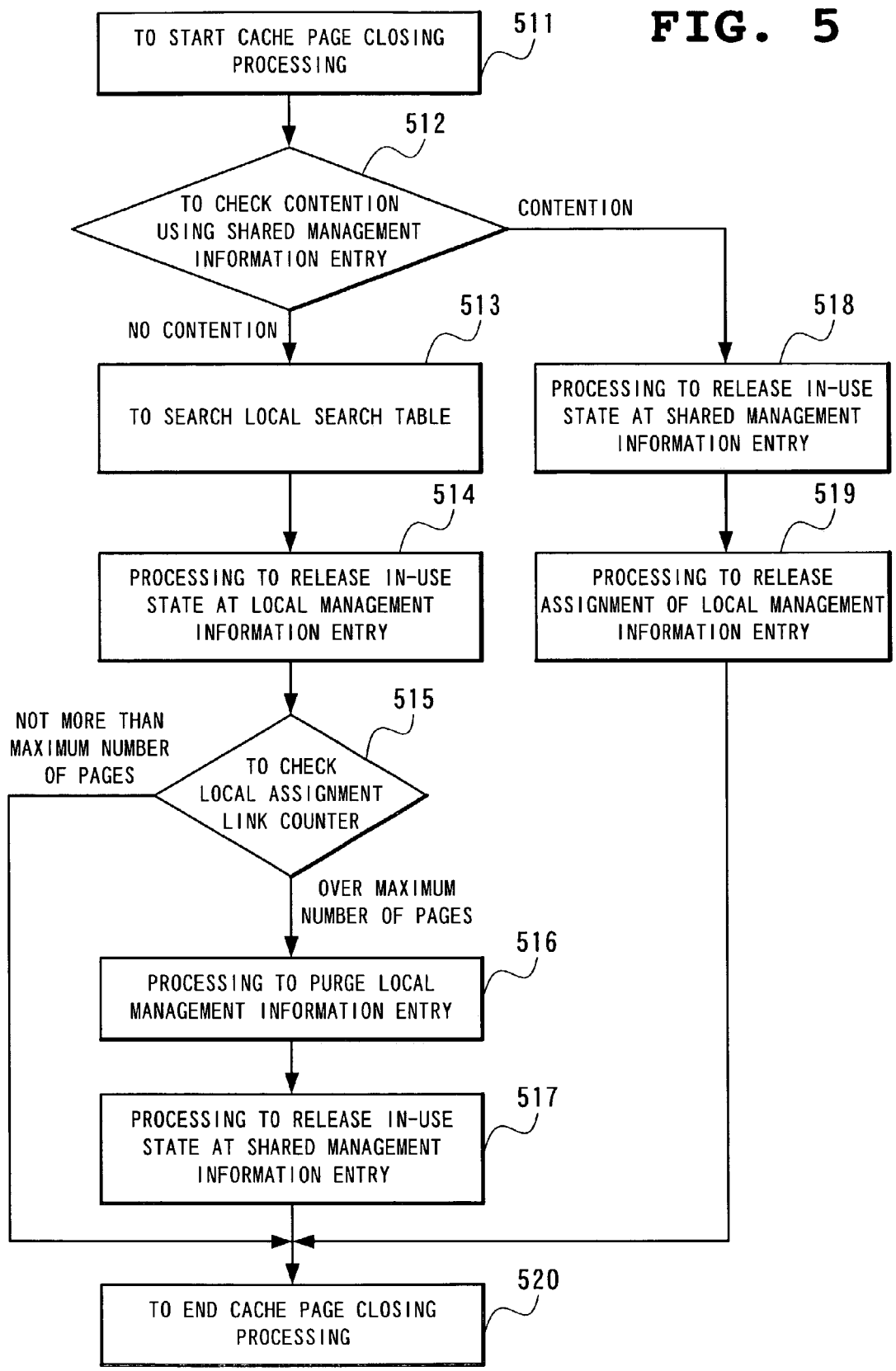
FIG. 5 is a flow chart showing closing processing of a cache page in the host director after data transfer is completed in the disk array device to which the disk cache management method according to the first embodiment of the present invention is applied.

FIG. 5 is a flow chart showing cache page closing processing after data transfer is completed. The cache page closing processing includes Step 511 of starting cache page closing processing, Step 512 of checking contention in a shared management information entry, Step 513 of searching the local search table, Step 514 of releasing the state of in-use in a local management information entry, Step 515 of checking the local assignment link counter, Step 516 of processing of purging the local management information entry, Step 517 of processing of releasing the state of in-use in the shared management information entry, Step 518 of processing of releasing the state of in-use in the shared management information entry, Step 519 of processing of releasing local management information entry assignment and Step 520 of ending cache page closing processing.

Figure 6:
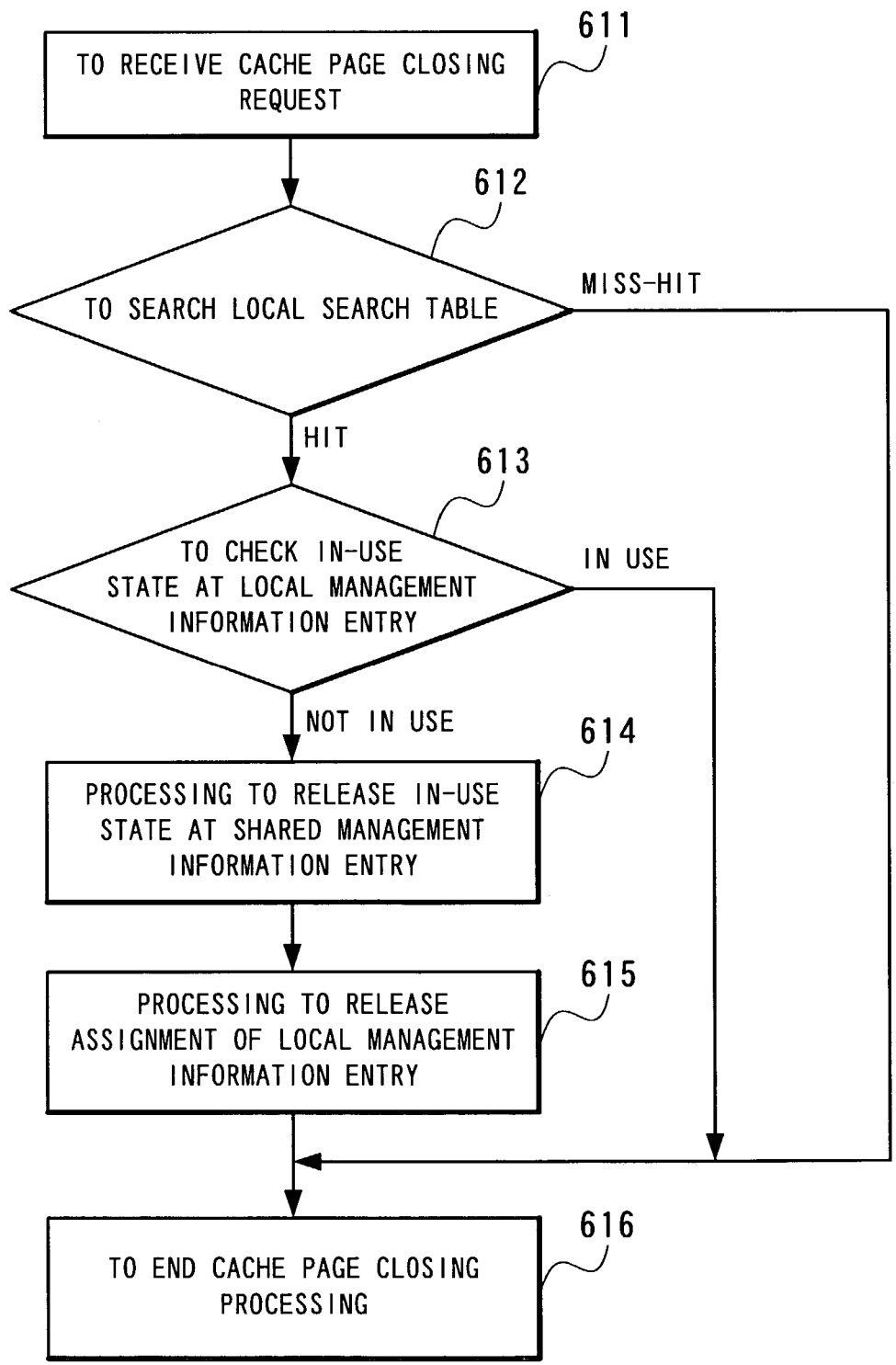
FIG. 6 is a flow chart showing closing request reception processing in the host director when receiving a cache page closing request in the disk array device to which the disk cache management method according to the first embodiment of the present invention is applied.

FIG. 6 is a flow chart showing closing request reception processing when receiving a cache page closing request. The closing request reception processing includes Step 611 of receiving a cache page closing request, Step 612 of searching the local search table, Step 613 of checking the in-use state in a local management information entry, Step 614 of releasing the in-use state in a shared management information entry, Step 615 of releasing assignment of the local management information entry, and Step 616 of ending cache page closing processing.

Next, a processing procedure of thus arranged disk cache management method of the disk array device according to the first embodiment will be described with reference to FIGS. 1 to 6. In the following, the description will be made with a host which transits a read/write command as a host 11a and a host director which receives a read/write command as a host director 12a.

(1) Cache Page Opening Processing at the Host Director 12a when Receiving a Read/Write Command from the Host 11a (See FIG. 4)

When receiving a read/write command from the host 11a, the host director 12a starts processing of opening a cache page corresponding to an access address (address in question) of the read/write command (Step 411).

First, the host director 12a searches the shared search table 21 for a shared management information entry being assigned to the cache page (cache page in question) corresponding to the address in question (Step 412). In this search processing, the shared search table 21 is looked up with a key obtained by hashing the address in question by a predetermined hash function to search for a shared management information entry linked by obtained forward pointer and backward pointer.

When in the search at Step 412, no shared management information entry is assigned to the cache page in question to result in a miss-hit, after caching the cache page in question from the physical disk array 14 into the cache page region 152 on the shared memory 15, the host director 12*a* conducts processing of assigning a shared management information entry to the cache page in question (Step 426). In this assignment processing, when there is a shared management information entry yet to be assigned in the shared non-assignment link [24, . . . , 25], assign the shared management information entry in question to the cache page in question and when there is no shared management information entry yet to be assigned in the shared non-assignment link [24, . . . , 25], obtain a shared management information entry yet to be assigned by the processing of purging a shared management information entry from the shared assignment link [22, . . . , 23] (LRU control) to link the obtained shared management information entry in question with the shared search table 21, as well as linking the shared management information entry in question into the shared assignment link [22, . . . 23], thereby assigning the shared management information entry in question to the cache page in question. Thereafter, the host director 12*a* shifts the control to Step 424.

When in the search at Step 412, a shared management information entry is already assigned to the cache page in question to result in a hit, the host director 12*a* checks the in-use state of the cache page in question based on the in-use flag and a host director identifier in the in-use information of the shared management information entry in question (Step 413).

When in the in-use check at Step 413, no in-use flag is registered in the in-use information of the shared management information entry in question and therefore the cache page in question is not in use, the host director 12*a* shifts the control to Step 424.

When in the in-use check at Step 413, the in-use flag and other host director identifier are registered in the in-use information of the shared management information entry in question and therefore the cache page in question is being used by other host director, the host director 12*a* accumulates its own host director identifier in the queue of the shared management information entry in question (Step 421). In practice, since other host director identifier is already accumulated in the queue, accumulate its own identifier at the end of the accumulation.

Next, the host director 12*a* transmits a request for closing the cache page in question to the host director using the cache page in question indicated by the host director identifier registered in the in-use information of the shared management information entry in question (Step 422).

Subsequently, the host director 12*a* waits for the cache page in question to be released from the in-use state (Step 423) and when it is released from the in-use state, shifts the control to Step 424.

When in the in-use check at Step 413, the in-use flag and its own host director identifier are registered in the in-use information of the shared management information entry in question and therefore the cache page in question is being used by the own host director 12*a*, the host director 12*a* refers to the queue of the shared management information entry in question to check contention for use of the cache page in question (Step 414). In this contention check, check whether one or more host director identifiers are accumulated in the queue of the shared management information entry in question.

When in the contention check at Step 414, one or more host director identifiers are accumulated in the queue of the shared management information entry in question and therefore contention exists for the use of the cache page in question, the host director 12*a* accumulates its own host director identifier in the queue of the shared management information entry in question (Step 420). In practice, since other host director identifier is already accumulated in the queue, accumulate its own identifier at the end of the accumulation.

Next, the host director 12*a* waits for the cache page in question from being released from the in-use state (Step 423) and when it is released, shifts the control to Step 424.

At Step 424, the host director 12*a* conducts processing of setting the cache page in question to which the shared management information entry in question is assigned to be in use. In this in-use setting processing, register the in-use flag and its own host director identifier in the in-use information of the shared management information entry in question to link out the shared management information entry in question from the shared assignment link [22, . . . , 23] such that the entry will not be purged during the use of the cache page in question.

Next, since the host director 12*a* newly sets the cache page in question to be at the in-use state, it conducts processing of assigning a local management information entry to the cache page in question (Step 425). In this assignment processing, obtain one local management information entry yet to be assigned from the local non-assignment link [34, . . . , 35] and then set the assigned address and the page identifier of the cache page in question at the local management information entry in question to link in the local search table 31 and link the local management information entry in question into the local assignment link [32, . . . , 33].

Subsequently, the host director 12*a* conducts processing of setting the cache page in question to be in use in the local management information entry (Step 417) to end the cache page opening processing (Step 427). In the in-use setting processing, register the in-use flag and the task identifier in the in-use information of the local management information entry in question, as well as linking out the local management information entry in question from the local assignment link [32, . . . , 33] such that the entry will not be purged during the use of the cache page in question.

When in the contention check at Step 414, no host director identifier is accumulated in the queue of the shared management information entry in question and therefore there is no contention for the use of the cache page in question, the host director 12*a* searches the local search table 31 for a local management information entry being assigned to the cache page in question (Step 415). Here, the cache page in question inevitably hits because it is at the steady open state.

Next, the host director 12*a* checks contention for the use of the cache page in question at the steady open state with reference to the queue of the local management information entry in question (Step 416). In the contention check, check whether one or more task identifiers are accumulated in the queue of the local management information entry in question.

When in the contention check at Step 416, one or more task identifiers are accumulated in the queue of the local management information entry in question and therefore the cache page in question at the steady open state is being used by other processing task to have contention for use, the host director 12*a* accumulates its own task identifier in the queue of the local management information entry in question (Step 418). In practice, since other task identifier is already accumulated in the queue, accumulate its own task identifier at the end of the accumulation.

Next, the host director 12*a* waits for the in-use state in the local management information entry in question to be released (Step 419) and when it is released, conducts processing of setting the cache page in question at the in-use state in the local management information entry (Step 417) to end the cache page opening processing (Step 427). In the in-use setting processing, register the in-use flag and the task identifier in the in-use information of the local management information entry in question, as well as linking out the local management information entry in question from the local assignment link [32, . . . , 33] such that the entry will not be purged during the use of the cache page in question.

When in the contention check at Step 416, no task identifier is accumulated in the queue of the local management information entry in question and therefore no contention exists for the use of cache page in question at the steady open state, the host director 12*a* conducts processing of setting the cache page in question to be in use in the local management information entry (Step 417) to end the cache page opening processing (Step 427). In this in-use setting processing, register the in-use flag and the task identifier in the in-use information of the local management information entry in question, as well as linking out the local management information entry in question from the local assignment link [32, . . . , 33] such that the entry will not be purged during the use of the cache page in question. In the case where Step 417 is conducted, which is a case where a cache page at the steady open state is hit, the host director 12*a* makes no access to the shared memory 15 in other processing than the first check processing at Steps 412 to 414.

(2) Cache Page Closing Processing After Data Transfer is Completed (See FIG. 5)

Upon completing data transfer between the host 11*a* and the cache page region 152 in the processing of a read/write command from/to the host 11*a*, the host director 12*a* starts processing of closing a cache page corresponding to the address in question (Step 511).

First, the host director 12*a* checks contention for the use of the cache page in question with reference to the queue of the shared management information entry in question (Step 512). In this contention check, check whether one or more host director identifiers are accumulated in the queue of the shared management information entry.

When in the contention check at Step 512, one or more host director identifiers are accumulated in the queue of the shared management information entry in question to have contention for the use of the cache page in question, the host director 12*a* conducts processing of releasing the cache page in question from the in-use state because the cache page in question is not allowed to be at the steady open state (Step 518). In the in-use releasing processing, release (erase) the registration of the in-use flag and the host director identifier in the in-use information of the shared management information entry in question, as well as linking the shared management information entry in question into the shared assignment link [22, . . . , 23].

Next, the host director 12*a* conducts processing of releasing assignment of the local management information entry in question (Step 519) to complete the processing of closing the cache page in question (Step 520). In the assignment releasing processing, conduct in-use releasing processing of releasing (erasing) the registration of the in-use flag and the task identifier in the in-use information of the local management information entry in question and linking the local management information entry in question into the local assignment link [32, . . . , 33], and further link out the local management information entry in question from the local search table 31 and the local assignment link [32, . . . , 33] and link the same into the local non-assignment link [34, . . . , 35].

When in the contention check at Step 512, no host director identifier is accumulated in the queue of the shared management information entry in question to have no contention for the cache page in question, the host director 12*a* searches the local search table 31 for a local management information entry being assigned to the cache page in question (Step 513). Here, since the cache page in question is at the steady open state, it inevitably hits.

Next, the host director 12*a* conducts processing of releasing the cache page in question from the in-use state in the local management information entry in question (Step 514). In the in-use releasing processing, release (erase) the registration of the in-use flag and the task identifier in the in-use information of the local management information entry in question and link the local management information entry in question into the local assignment link [32, . . . , 33]. Here, the cache page in question is subjected neither to the processing of releasing the in-use state at the shared management information entry nor to the processing of linking out from the local assignment link [32, . . . , 33] at the local management information entry, so that the cache page in question is at the steady open state.

Subsequently, the host director 12*a* checks whether the count value of the local assignment link counter 37 exceeds a predetermined maximum number of pages (Step 515).

When in the check of the maximum number of pages at Step 515, the count value of the local assignment link counter 37 exceeds the maximum number of pages, the host director 12*a* conducts processing of purging the local management information entry in question from the local assignment link [32, . . . , 33] (LRU control) (Step 516). In the purging processing, purge the local management information entry located at the end from the local assignment link [32, . . . , 33] to link in the local non-assignment link [34, . . . , 35].

Next, the host director 12*a* conducts processing of releasing the in-use state at the shared management information entry from the shared assignment link [22, . . . , 23] (Step 517) to end the processing of closing the cache page in question (Step 520). In the in-use releasing processing, conduct releasing (erasure) the registration of the in-use flag and the host director identifier in the in-use information of the shared management information entry in question and linking the shared management information entry in question into the shared non-assignment link [24, . . . , 25].

When in the check of the maximum number of pages at Step 515, the count value of the local assignment link counter 37 fails to exceed the maximum number of pages, the host director 12*a* completes the cache page closing processing (Step 520).

In the first embodiment, in addition to the above-described cache page opening processing and closing processing, closing request reception processing is required upon receiving a cache page closing request.

(3) Closing Request Reception Processing when Receiving a Cache Page Closing Request (See FIG. 6)

Upon receiving a cache page closing request from other host director, the host director 12*a* starts processing of closing the cache page in question (Step 611).

First, the host director 12*a* searches the local search table 31 for a local management information entry assigned to the cache page in question (Step 612). In this search processing, the local search table 31 is looked up with a key obtained by hashing the address in question by a predetermined hash function to search for a shared management information entry linked by obtained forward pointer and backward pointer.

When in the search at Step 612, no local management information entry is searched for to result in a miss-hit, which means that the local management information entry crosses to be already released from being assigned, the host director 12a completes the cache page closing processing (Step 616).

When in the search at Step 612, a local management information entry is searched for to result in a hit, the host director 12a checks the in-use state of the cache page in question based on the in-use flag in the in-use information of the local management information entry in question (Step 613).

When in the in-use check at Step 613, the cache page in question is being in use, which means that other host director is using the cache page in question, it is impossible to immediately release the assignment of the local management information entry in question to the cache page in question. However, because other host director using the cache page in question will release the assignment of the local management information entry in question to the cache page in question after using the cache page in question, end the processing of closing the cache page in question (Step 616).

When in the in-use check at Step 613, the cache page in question is not in use, the cache page in question is at the steady open state, so that the host director 12a actually conducts processing of releasing the in-use state at the shared management information entry (Step 614). In this in-use releasing processing, conduct releasing (erasing) the registration of the in-use flag and the host director identifier in the in-use information of the shared management information entry in question and linking the shared management information entry into the shared assignment link [22, . . . , 23].

Next, the host director 12a conducts processing of releasing the assignment of the local management information entry in question (Step 615) to end the processing of closing the cache page in question (Step 616). In the assignment releasing processing, conduct in-use state releasing processing of releasing (erasing) registration of the in-use flag and the task identifier in the in-use information of the local management information entry in question and linking the local management information entry in question into the local assignment link [32, . . . , 33] and further link out the local management information entry assigned to the cache page in question from the local search table 31 and the local assignment link [32, . . . , 33] and link the same into the local non-assignment link [34, . . . , 35].

According to the first embodiment, in a read/write command from a host, response performance in cache hit through the same host director can be improved. This is because in several times of read/write accesses to the same cache page, only when it is through the same host director, the cache page is opened/closed with a reduced number of accesses to the shared memory, so that a read/write access response can be reduced.

[Second Embodiment]

Since the first embodiment is premised on that the maximum number of cache pages at the steady open state is a static basic value, fixedly used is, for example, a value obtained by evenly dividing a certain rate of the total cache pages as a maximum rate of cache pages at the steady open state by the number of host directors mounted on the disk array device. In some of disk array devices mounted with a plurality of host directors, a certain host director might not be connected or might not receive a read/write command so frequently and required performance might vary depending on a host connected. Described in the second embodiment is a method of varying a maximum number of pages at the steady open state by a host director based on a reference value set in advance and dynamically changing the maximum number of pages according to the actual number of commands received recently.

Figure 7:
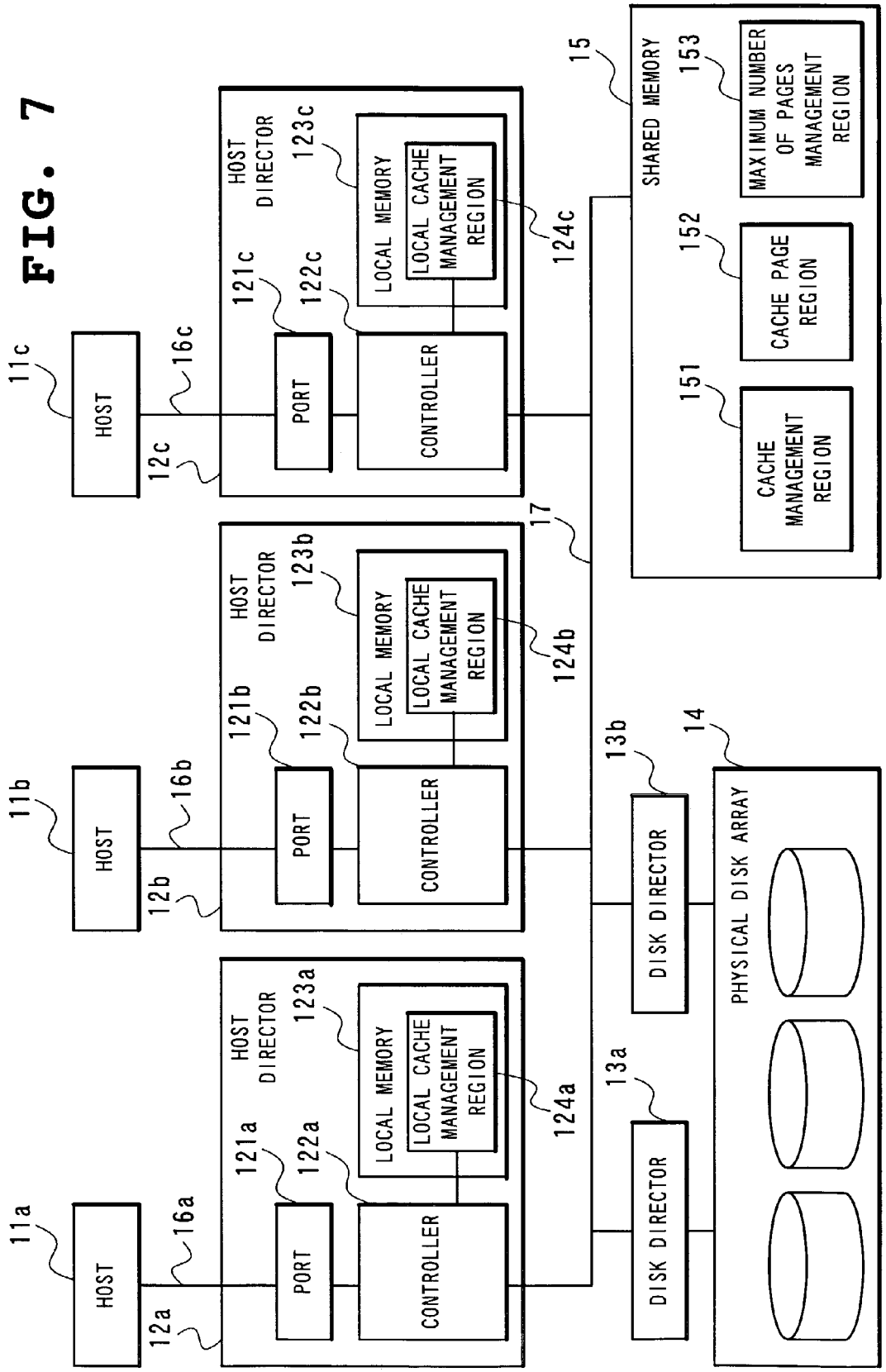
FIG. 7 is a block diagram showing a structure of a disk array device to which a disk cache management method according to a second embodiment of the present invention is applied.

FIG. 7 is a block diagram showing a structure of a disk array device to which a disk cache management method according to a second embodiment of the present invention is applied. The disk array device differs from the disk array device shown in FIG. 1 to which the disk cache management method according to the first embodiment is applied only in further including a maximum number of pages management region 153 provided on the shared memory 15 for dynamically managing a maximum number of cache pages at the steady open state. Therefore, the same or corresponding parts are given the same reference numerals to omit their detailed description from the specification.

FIG. 8 is a diagram illustrating the contents of the maximum number of pages management region 153 provided on the shared memory 15 in the second embodiment. Host director maximum number of pages management information 81a, 81b, 81c is management information for determining a maximum number of pages of each of the host directors 12a, 12b and 12c identified by the director identifiers. The host director maximum number of pages management information 81a, 81b and 81c includes access frequencies 811a, 811b and 811c and priorities 812a, 812b and 812c. The access frequencies 811a, 811b and 811c are regions in which access frequency information in the host directors 12a, 12b and 12c are periodically written by the host directors 12a, 12b and 12c. This enables each of the host directors 12a, 12b and 12c to know access frequencies of all the host directors 12a, 12b and 12c. As a result, with a certain rate of all the cache pages as a maximum rate of cache pages at the steady open state, each of the host directors 12a, 12b and 12c is allowed to set, as a maximum number of pages, a value obtained by multiplying the maximum rate by a rate of its own host director access frequency to all the access frequencies. In a host director having a higher access frequency, accordingly, more cache pages at the steady open state are allowed to increase a cache hit rate of cache pages at the steady open state. On the other hand, the priorities 812a, 812b and 812c are elements which vary a maximum number of pages in advance depending on how the host directors 12a, 12b and 12c are used. In the above-described calculation of a maximum number of pages, with a certain rate of all the cache pages as a maximum rate of cache pages at the steady open state, a value obtained by further multiplying, by weights of the priorities 812a, 812b and 812c, a value which is obtained by multiplying the maximum rate by a rate of its own host director access frequency to all the access frequencies 811a, 811b and 811c is assumed to be a maximum number of pages. In other words, when the priorities 812a, 812b and 812c are zero, no steady open is realized irrespective of the access frequencies 811a, 811b and 811c and when the priorities 812a, 812b and 812c are high, cache-hit of a cache page at the steady open state can be expected even if the access frequencies 811a, 811b and 811c are low.

According to the second embodiment, appropriate number of cache pages at the steady open state distributed to the plurality of host directors not only leads to an increase in a cache-hit rate of cache pages at the steady open state but also enables cache-hit performance to be ensured for an access from a host whose access frequency is low.

[Third Embodiment]

FIG. 9 is a block diagram showing a structure of a disk array device to which a disk cache management method according to a third embodiment of the present invention is applied. The disk array device differs from the disk array device shown in FIG. 1 to which the disk cache management method according to the first embodiment is applied only in further including host director programs 100 for the respective host directors 12a, 12b and 12c of the disk array device.

The host director program 100 is read into each of the host directors 12a, 12b and 12c to control operation of each of the host directors 12a, 12b and 12c completely in the same manner as that for the operation of the host directors 12a, 12b and 12c according to the first embodiment. Therefore, no detailed description will be made of operation of the disk array device to which the disk cache management method according to the third embodiment is applied.

[Fourth Embodiment]

FIG. 10 is a block diagram showing a structure of a disk array device to which a disk cache management method according to a fourth embodiment of the present invention is applied. The disk array device differs from the disk array device shown in FIG. 7 to which the disk cache management method according to the second embodiment is applied only in further including host director programs 200 for the respective host directors 12a, 12b and 12c of the disk array device.

The host director program 200 is read into each of the host directors 12a, 12b and 12c to control operation of each of the host directors 12a, 12b and 12c completely in the same manner as that for the operation of the host directors 12a, 12b and 12c according to the second embodiment. Therefore, no detailed description will be made of operation of the disk array device to which the disk cache management method according to the fourth embodiment is applied.

The effect of the present invention is to improve response performance when a read/write command from a host has a cache-hit through the same host director. The reason is that in several times of read/write accesses to the same cache page, as long as the access is through the same host director, cache pages are opened/closed with a reduced number of accesses to a shared memory, which results in shortening a read/write access response. In practice, because a command from the same host is very likely to be a command through the same host director, performance can be improved in general.

In a case where connection is made to the same host through a plurality of ports, an access to the same address might be made through other host director. In this case, although an overhead in the processing of the present invention might cause a slight delay in a response, the deterioration in response is not so serious that even in such a case, when accesses to the same cache page are made through the same port in one time and through other port in another to have randomly distributed accesses, the response improvement effect attained by the present invention is greater than the disadvantage of deterioration to have improved performance.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A disk cache management method of a disk array device mounted with a plurality of host directors and a shared memory shared by the host directors and serving as a disk cache, wherein
each host director is mounted with a local memory, each local memory having a local cache management region for managing a cache page at a steady open state on said shared memory, wherein the method comprises:
subjecting a cache page on said shared memory to opening processing and finishing using the cache page,
releasing a state of in-use of the cache page in question only on said local cache management region, and
on said shared memory, bringing the cache page in question to a steady open state where the cache page remains open without being subjected to closing processing.

2. A disk cache management method of a disk array device mounted with a plurality of host directors and a shared memory shared by the host directors and having a cache page region and a cache management region, wherein
each host director is mounted with a local memory, each local memory having a local cache management region for managing a cache page at a steady open state on said shared memory, wherein the method comprises:
a cache page opening step of, at the reception of a read/write command from a host, when a cache page in question is not in use, setting the cache page in question to be in use in a shared management information entry on said cache management region, as well as assigning a local management information entry on said local cache management region to set the cache page in question to be in use in the local management information entry in question, when the cache page in question is being used by other host director, accumulating its own host director identifier in a queue of the shared management information entry in question and after transmitting a request for closing the cache page in question to other host director, setting the cache page in question to be in use in the shared management information entry in question, as well as assigning the local management information entry in question to set the cache page in question to be in use in the local management information entry in question, and when the cache page in question is being used by its own host director, setting the cache page in question to be in use in the local management information entry in question while omitting the processing of setting the cache page in question to be in use in the shared management information entry in question,
a cache page closing step of, after finishing using the cache page in question, checking contention for the use of the cache page in question with reference to the queue of the shared management information entry in question, and when there is contention, releasing a state of in-use of the cache page in question in the shared management information entry in question, as well as releasing assignment of the local management information entry in question and when there is no contention, without releasing the in-use state of the cache page in question in the shared management information entry in question, releasing the in-use state of the cache page in question in the local management information entry in question to bring the cache page in question to a steady open state where the cache page in question remains open, and a closing request reception step of, at the reception of a request for closing the cache page in question from other host director, when the cache page in question is not in use, releasing the in-use state of the cache page in question in the shared management information entry in question, as well as releasing the assignment of the local management information entry in question.

3. The disk cache management method of a disk array device as set forth in claim 2, wherein said local cache management region is provided with a local assignment link counter for counting the number of local management information entries linked to said local assignment link, and which comprises the step of, when in said cache page closing processing, a count value of said local assignment link counter exceeds a maximum number of pages of cache pages at the steady open state which are set to be in use in said shared management information entry and released from the in-use state in said local management information entry, purging the local management information entry in question from said local assignment link by LRU control to link in said local assignment link and releasing the in-use state of the cache page in question in the shared management information in question.

4. The disk cache management method of a disk array device as set forth in claim 2, wherein said shared management information entry comprises:

an assigned address indicative of which data on a physical disk array is assigned to a cache page, a forward pointer and a backward pointer for setting up a link with a shared search table, a forward pointer and a backward pointer for forming a shared assignment link or a shared non-assignment link which is a bidirectional link with a shared assignment link MRU pointer and a shared assignment link LRU pointer, or a shared non-assignment link MRU pointer and a shared non-assignment link LRU pointer as start points, in-use information for registering an in-use flag and a host director identifier, and a queue for accumulating a host director identifier of other host director waiting for use of the cache page in question.

5. The disk cache management method of a disk array device as set forth in claim 2, wherein said local management information entry comprises:

an assigned address indicative of which data on a physical disk array is assigned to a cache page, a page identifier of the cache page in question, a forward pointer and a backward pointer for setting up a link with a local search table, a forward pointer and a backward pointer for forming a local assignment link or a local non-assignment link which is a bidirectional link with a local assignment link MRU pointer and a local assignment link LRU pointer, or a local non-assignment link MRU pointer and a local non-assignment link LRU pointer as start points, in-use information for registering an in-use flag and a task identifier, and a queue for accumulating a task identifier of other processing task waiting for use of the cache page in question.

6. A disk cache management method of a disk array device comprising a physical disk array, at least one disk director, a plurality of host directors and a shared memory shared by the disk director and the host directors, with a cache management region on said shared memory provided to have a shared management information entry one-to-one-corresponding to a cache page cached in a cache page region on said shared memory, a shared search table for searching all the shared management information entries for a shared management information entry assigned to a cache page by using an address, a shared assignment link MRU pointer and a shared assignment link LRU pointer as start points of a shared assignment link bidirectionally linking a shared management information entry which is assigned to a cache page but not in use among all the shared management information entries, and a shared non-assignment link MRU pointer and a shared non-assignment link LRU pointer as start points of a shared non-assignment link bidirectionally linking a shared management information entry which is yet to be assigned to a cache page among all the shared management information entries, wherein each host director is mounted with a local memory, a local cache management region on each local memory comprising:

a local management information entry one-to-one-corresponding to a cache page cached in the cache page region on said shared memory, a local search table for forming a link so as to make a local management information entry assigned to a cache page be searchable by an address among all the local management information entries, a local assignment link MRU pointer and a local assignment link LRU pointer as start points for forming a local assignment link bidirectionally linking a local management information entry which is assigned to a cache page but not in use among all the local management information entries, and a local non-assignment link MRU pointer and a local non-assignment link LRU pointer as start points for forming a local non-assignment link bidirectionally linking a local management information entry which is yet to be assigned to a cache page among all the local management information entries, and cache page opening processing comprises:

a) when receiving a read/write command from a host, searching the shared search table for a shared management information entry being assigned to a cache page in question corresponding to an address in question, b) when no shared management information entry is assigned, assigning a shared management information entry to the cache page in question, setting the cache page in question to be in use in the shared management information entry in question, assigning a local management information entry to the cache page in question and setting the cache page in question to be in use in the local management information entry in question, c) when a shared management information entry is assigned, checking whether the cache page in question is in use in the shared management information entry in question, d) when the cache page in question is not in use, setting the cache page in question to be in use in the shared management information entry in question, assigning a local management information entry to the cache page in question and setting the cache page in question to be in use in the local management information entry in question, e) when the cache page in question is being used by other host director, conducting accumulation in a queue of the shared management information entry in question, requesting closing of the cache page in question from other host director, waiting for a state of in-use of the cache page in question to be released in the shared management information entry in question to set the cache page in question to be in use in the shared management information entry in question, assigning a local management information entry to the cache page in question and setting the cache page in question to be in use in the local management information entry in question, f) when the cache page in question is being used by its own host director, checking contention for the use of the cache page in question with reference to the queue of the shared management information entry in question, g) when contention for the use of the cache page in question exists in the shared management information entry in question, conducting accumulation in the queue of the shared management information entry in question, waiting for the in-use state of the cache page in question to be released in the shared management information entry in question to set the cache page in question to be in use in the shared management information entry in question, assigning a local management information entry to the cache page in question and setting the cache page in question to be in use in the local management information entry in question, h) when no contention for the use of the cache page in question exists in the shared management information entry in question, searching said local search table for the local management information entry in question and checking contention for the use of cache page in question in the local management information entry in question, i) when contention for the use of the cache page in question exists in the local management information entry in question, conducting accumulation in a queue of the local management information entry in question and waiting for the in-use state of the cache page in question to be released in the local management information entry in question to set the cache page in question to be in use in the local management information entry in question, and j) when there exists no contention for the use of the cache page in question in the local management information entry in question, setting the cache page in question to be in use in the local management information entry in question without setting the cache page in question to be in use in the shared management information entry in question.

7. The disk cache management method of a disk array device as set forth in claim 6, wherein
cache page closing processing comprises:
when data transfer between the host and the cache page region is completed in processing of a read/write command from the host, checking contention for the use of a cache page in question with reference to the queue of the shared management information entry in question, when contention exists, releasing the in-use state of the cache page in question in the shared management information entry in question and releasing assignment of the local management information entry in question, and when no contention for use exists, searching said local search table for the local management information entry in question to release the in-use state of the cache page in question in the local management information entry in question, and closing request reception processing comprises:
when receiving a cache page closing request from other host director, searching said local search table for the local management information entry in question,
when the local management information entry in question is searched, checking the in-use state of the cache page in question in the local management information entry in question, and
when the cache page in question is not in use, releasing the in-use state of the cache page in question in the shared management information entry in question and releasing assignment of the local management information entry in question.

8. The disk cache management method of a disk array device as set forth in claim 7, wherein
said local cache management region is provided with a local assignment link counter for counting the number of local management information entries linked to said local assignment link, and
said cache page closing processing comprises, when a count value of said local assignment link counter exceeds a maximum number of cache pages at a steady open state which are set to be in use in said shared management information entry and released from the in-use state in said local management information entry, purging the local management information entry in question from said local assignment link by LRU control to link in said local assignment link and releasing the in-use state of the cache page in question in the shared management information in question.

9. The disk cache management method of a disk array device as set forth in claim 8, wherein
said maximum number of cache pages at the steady open state is determined by dividing a certain rate of the entire cache page as a maximum rate of cache pages at the steady open state by the number of host directors mounted.

10. The disk cache management method of a disk array device as set forth in claim 8, wherein
said maximum number of cache pages at the steady open state is determined by multiplying a certain rate of the entire cache page as a maximum rate of cache pages at the steady open state by a rate of the own host director access frequency to the entire access frequency.

11. The disk cache management method of a disk array device as set forth in claim 8, wherein
said maximum number of cache pages at the steady open state is determined by further multiplying, by a weight of priority, a value which is obtained by multiplying a certain rate of the entire cache page as a maximum rate of cache pages at the steady open state by a rate of the own host director access frequency to the entire access frequency.

12. The disk cache management method of a disk array device as set forth in claim 6, wherein said shared management information entry comprises:

an assigned address indicative of which data on the physical disk array is assigned to a cache page, a forward pointer and a backward pointer for setting up a link with the shared search table, a forward pointer and a backward pointer for forming the shared assignment link or the shared non-assignment link which is a bidirectional link with the shared assignment link MRU pointer and the shared assignment link LRU pointer, or the shared non-assignment link MRU pointer and the shared non-assignment link LRU pointer as start points, in-use information for registering an in-use flag and a host director identifier, and a queue for accumulating a host director identifier of other host director waiting for use of the cache page in question.

13. The disk cache management method of a disk array device as set forth in claim 6, wherein said local management information entry comprises:

an assigned address indicative of which data on the physical disk array is assigned to a cache page, a page identifier of the cache page in question, a forward pointer and a backward pointer for setting up a link with the local search table, a forward pointer and a backward pointer for forming the local assignment link or the local non-assignment link which is a bidirectional link with the local assignment link MRU pointer and the local assignment link LRU pointer, or the local non-assignment link MRU pointer and the local non-assignment link LRU pointer as start points, in-use information for registering an in-use flag and a task identifier, and a queue for accumulating a task identifier of other processing task waiting for use of the cache page in question.

14. A disk array device comprising:

a plurality of host directors; and a shared memory shared by the host directors and serving as a disk cache, wherein each host director comprises:

a port connected to a host, a controller connected to said host through the port and to said shared memory through a bus, and a local memory connected to the controller and provided with a local cache management region for managing a cache page at a steady open state on said shared memory where the cache page remains open without being subjected to closing processing.

15. The disk array device as set forth in claim 14, wherein said shared management information entry comprises:

an assigned address indicative of which data on a physical disk array is assigned to a cache page, a forward pointer and a backward pointer for setting up a link with a shared search table, a forward pointer and a backward pointer for forming a shared assignment link or a shared non-assignment link which is a bidirectional link with a shared assignment link MRU pointer and a shared assignment link LRU pointer, or a shared non-assignment link MRU pointer and a shared non-assignment link LRU pointer as start points, in-use information for registering an in-use flag and a host director identifier, and a queue for accumulating a host director identifier of other host director waiting for use of the cache page in question.

16. The disk array device as set forth in claim 14, wherein said local management information entry comprises:

an assigned address indicative of which data on a physical disk array is assigned to a cache page, a page identifier of the cache page in question, a forward pointer and a backward pointer for setting up a link with a local search table, a forward pointer and a backward pointer for forming a local assignment link or a local non-assignment link which is a bidirectional link with a local assignment link MRU pointer and a local assignment link LRU pointer, or a local non-assignment link MRU pointer and a local non-assignment link LRU pointer as start points, in-use information for registering an in-use flag and a task identifier, and a queue for accumulating a task identifier of other processing task waiting for use of the cache page in question.

17. A disk array device comprising a physical disk array, at least one disk director, a plurality of host directors and a shared memory shared by the disk director and the host directors, with a cache management region on said shared memory provided to have a shared management information entry one-to-one-corresponding to a cache page cached in a cache page region on said shared memory, a shared search table for forming a link so as to make a shared management information entry assigned to a cache page be searchable by an address among all the shared management information entries, a shared assignment link MRU pointer and a shared assignment link LRU pointer as start points for forming a shared assignment link bidirectionally linking a shared management information entry which is assigned to a cache page but not in use among all the shared management information entries, and a shared non-assignment link MRU pointer and a shared non-assignment link LRU pointer as start points for forming a shared non-assignment link bidirectionally linking a shared management information entry which is yet to be assigned to a cache page among all the shared management information entries, wherein each host director is mounted with a local memory, a local cache management region on said local memory having:

a local management information entry one-to-one-corresponding to a cache page cached in the cache page region on said shared memory, a local search table for forming a link so as to make a local management information entry assigned to a cache page be searchable by an address among all the local management information entries, a local assignment link MRU pointer and a local assignment link LRU pointer as start points for forming a local assignment link bidirectionally linking a local management information entry which is assigned to a cache page but not in use among all the local management information entries, and a local non-assignment link MRU pointer and a local non-assignment link LRU pointer as start points for forming a local non-assignment link bidirectionally linking a local management information entry which is yet to be assigned to a cache page among all the local management information entries.

18. The disk array device as set forth in claim 17, wherein said shared management information entry comprises:

an assigned address indicative of which data on the physical disk array is assigned to a cache page, a forward pointer and a backward pointer for setting up a link with the shared search table,
a forward pointer and a backward pointer for forming the shared assignment link or the shared non-assignment link which is a bidirectional link with the shared assignment link MRU pointer and the shared assignment link LRU pointer, or the shared non-assignment link MRU pointer and the shared non-assignment link LRU pointer as start points,
in-use information for registering an in-use flag and a host director identifier, and
a queue for accumulating a host director identifier of other host director waiting for use of the cache page in question.

19. The disk array device as set forth in claim 17, wherein said local management information entry comprises:
an assigned address indicative of which data on the physical disk array is assigned to a cache page,
a page identifier of the cache page in question,
a forward pointer and a backward pointer for setting up a link with the local search table,
a forward pointer and a backward pointer for forming the local assignment link or the local non-assignment link which is a bidirectional link with the local assignment link MRU pointer and the local assignment link LRU pointer, or the local non-assignment link MRU pointer and the local non-assignment link LRU pointer as start points,
in-use information for registering an in-use flag and a task identifier, and
a queue for accumulating a task identifier of other processing task waiting for use of the cache page in question.

20. A program for conducting disk cache management of a disk array device mounted with a plurality of host directors and a shared memory shared by the host directors and serving as a disk cache, which executes:
a cache page opening function of:
when receiving a read/write command from a host, when a cache page in question is not in use, setting the cache page in question to be in use in a shared management information entry on said cache management region, as well as assigning a local management information entry on said local cache management region to set the cache page in question to be in use in the local management information entry in question,
when the cache page in question is being used by other host director, accumulating its own host director identifier in a queue of the shared management information entry in question and after transmitting a request for closing the cache page in question to other host director, setting the cache page in question to be in use in the shared management information entry in question, as well as assigning the local management information entry in question to set the cache page in question to be in use in the local management information entry in question, and
when the cache page in question is being used by its own host director, setting the cache page in question to be in use in the local management information entry in question while omitting processing of setting the cache page in question in use in the shared management information entry in question,
a cache page closing function of:
after completing the use of the cache page in question, referring to the queue of the shared management information entry in question to check contention for the use of the cache page in question,
when contention exits, releasing the in-use state of the cache page in question in the shared management information entry in question, as well as releasing the assignment of the local management information entry in question, and
when no contention exists, without releasing the in-use state of the cache page in question in the shared management information entry in question, releasing the in-use state of the cache page in question in the local management information entry in question to bring the cache page in question to a steady open state where the cache page remains open, and
a closing request reception function of, at the reception of a request for closing the cache page in question from other host director, when the cache page in question is not in use, releasing the in-use state of the cache page in question in the shared management information entry in question, as well as releasing the assignment of the local management information entry in question.

21. A program for conducting disk cache management of a disk array device mounted with a plurality of host directors and a shared memory shared by the host directors and serving as a disk cache, which executes:
a cache page opening function including the steps of:
when receiving a read/write command from a host, searching a shared search table for a shared management information entry being assigned to a cache page in question corresponding to an address in question,
when no shared management information entry is assigned, assigning a shared management information entry to the cache page in question, setting the cache page in question to be in use in the shared management information entry in question, assigning a local management information entry to the cache page in question and setting the cache page in question to be in use in the local management information entry in question,
when a shared management information entry is assigned, checking whether the cache page in question is in use in the shared management information entry in question,
when the cache page in question is not in use, setting the cache page in question to be in use in the shared management information entry in question, assigning a local management information entry to the cache page in question, and setting the cache page in question to be in use in the local management information entry in question,
when the cache page in question is being used by other host director, conducting accumulation in a queue of the shared management information entry in question, requesting closing of the cache page in question from other host director, waiting for the in-use state of the cache page in question to be released in the shared management information entry in question to set the cache page in question to be in use in the shared management information entry in question, assigning a local management information entry to the cache page in question and setting the cache page in question to be in use in the local management information entry in question,
when the cache page in question is being used by its own host director, checking contention for use of the cache page in question with reference to the queue of the shared management information entry in question, when contention for use of the cache page in question exists in the shared management information entry in question, conducting accumulation in the queue of the shared management information entry in question, waiting for the in-use state of the cache page in question to be released in the shared management information entry to set the cache page in question to be in use in the shared management information entry, assigning a local management information entry to the cache page in question and setting the cache page in question to be in use in the local management information entry in question, when no contention for use of the cache page in question exists in the shared management information entry in question, searching said local search table for the local management information entry in question and checking contention for use of the cache page in question in the local management information entry in question, when contention for use of the cache page in question exists in the local management information entry in question, conducting accumulation in a queue of the local management information entry in question and waiting for the in-use state of the cache page in question to be released in the local management information entry in question to set the cache page in question to be in use in the local management information entry in question, and when no contention for use of the cache page in question exists in the local management information entry in question, setting the cache page in question to be in use in the local management information entry in question without setting the cache page in question to be in use in the shared management information entry in question, a cache page closing function including the steps of:

when completing data transfer between a host and a cache page region in the processing of a read/write command from the host, checking contention for use of a cache page in question with reference to the queue of the shared management information entry in question, when contention exits, releasing the in-use state of the cache page in question in the shared management information entry in question and releasing the assignment of the local management information entry in question, and when no contention exists, searching said local search table for the local management information entry in question to release the in-use state of the cache page in question in the local management information entry in question, and a closing request reception function including the steps of:

when receiving a request for closing a cache page from other host director, searching said local search table for a local management information entry in question, when the local management information entry in question is searched, checking the state of use of the cache page in question in the local management information entry in question, and when the cache page in question is not in use, releasing the in-use state of the cache page in question in the shared management information entry in question and releasing the assignment of the local management information entry in question.

\* \* \* \* \*